United States Patent
Kessler et al.

(10) Patent No.: US 10,467,915 B2
(45) Date of Patent: Nov. 5, 2019

(54) AUTONOMOUS VEHICLE SYSTEM EMPLOYING TIME DOMAIN DYNAMIC BUFFERS WHEN MATCHING PASSENGERS AND VEHICLES

(71) Applicant: Wayfarer, Inc., San Francisco, CA (US)

(72) Inventors: Patrick Kessler, San Francisco, CA (US); Eric Mehdi Monsef, Monte Sereno, CA (US); Peter Robert Williams, Belmont, CA (US); Lars Herold, Pyrmont (AU)

(73) Assignee: WAYFARER, INC., San Francisco, CA (US)

( * ) Notice: Subject to any disclaimer, the term of this patent is extended or adjusted under 35 U.S.C. 154(b) by 0 days.

(21) Appl. No.: 16/003,935

(22) Filed: Jun. 8, 2018

(65) Prior Publication Data
US 2018/0357912 A1    Dec. 13, 2018

Related U.S. Application Data

(60) Provisional application No. 62/517,607, filed on Jun. 9, 2017.

(51) Int. Cl.
*G08G 7/00* (2006.01)
*G08G 7/02* (2006.01)
(Continued)

(52) U.S. Cl.
CPC ............. *G08G 7/02* (2013.01); *G05D 1/0285* (2013.01); *G05D 1/0297* (2013.01); *G06Q 10/08* (2013.01);
(Continued)

(58) Field of Classification Search
None
See application file for complete search history.

(56) References Cited

U.S. PATENT DOCUMENTS 4,018,410 A * 4/1977 Renaux ................... B61B 13/00
                                                           705/7.12
5,063,857 A * 11/1991 Kissel, Jr. ............... B61B 13/00
                                                           104/88.04
(Continued)

FOREIGN PATENT DOCUMENTS

CN    101395647    3/2009
CN    103309350    9/2013
(Continued)

OTHER PUBLICATIONS

International Search Report and Written Opinion for International Patent Application No. PCT/US18/20266 dated Jun. 11, 2018.
(Continued)

*Primary Examiner* — Jonathan M Dager
(74) *Attorney, Agent, or Firm* — K&L Gates LLP

(57) ABSTRACT

A system includes a plurality of at least partially autonomous vehicles, a plurality of interconnected roadways having a plurality of track segments, and embarkation area, and a control system. The roadways preferably have at least partially separated lanes and the roadways are optionally grade separated. The embarkation area includes a plurality of embarkation slots where passengers can board the vehicles. The embarkation area is connected to at least one of the plurality of track segments, allowing the vehicles to travel to and from the embarkation area to the at least one of the plurality of track segments. The control system is configured to coordinate a continuous flow of the plurality of vehicles on the track segments. Groups of vehicles depart
(Continued)

from the embarkation area to the at least one of the plurality of track segments in coordinated groups.

26 Claims, 23 Drawing Sheets

(51) Int. Cl.
    *G05D 1/02*     (2006.01)
    *G06Q 50/30*     (2012.01)
    *G06Q 10/08*     (2012.01)

(52) U.S. Cl.
    CPC ............ *G06Q 50/30* (2013.01); *G08G 7/00* (2013.01); *G05D 2201/0212* (2013.01)

(56) References Cited

U.S. PATENT DOCUMENTS

| | | | |
|---|---|---|---|
| 6,169,954 B1* | 1/2001 | McCrary | B60L 50/66 701/117 |
| 6,810,817 B1* | 11/2004 | James | B61B 13/04 104/88.02 |
| 8,006,625 B2* | 8/2011 | Yang | B61B 13/10 104/130.07 |
| 8,682,511 B2* | 3/2014 | Andreasson | B61L 23/34 104/19 |
| 8,720,345 B1* | 5/2014 | English | B61F 19/02 105/141 |
| 8,825,255 B2* | 9/2014 | Boss | G06Q 10/06316 701/23 |
| 9,552,564 B1 | 1/2017 | Martenis | |
| 9,715,233 B1 | 7/2017 | Mandeville-Clarke et al. | |
| 9,799,221 B2* | 10/2017 | Baller | G01S 19/14 |
| 2001/0037174 A1* | 11/2001 | Dickerson | G07B 15/00 701/400 |
| 2003/0236598 A1* | 12/2003 | Villarreal Antelo | B61L 25/025 701/19 |
| 2004/0011242 A1* | 1/2004 | Roane | B60F 1/04 105/72.2 |
| 2004/0225421 A1* | 11/2004 | Wu | B61L 27/04 701/19 |
| 2005/0107954 A1* | 5/2005 | Nahla | B61L 25/021 701/301 |
| 2007/0027825 A1 | 2/2007 | Pearce et al. | |
| 2008/0119965 A1* | 5/2008 | McCrary | B60C 7/00 701/2 |
| 2013/0048795 A1* | 2/2013 | Cross | B61L 15/0027 246/122 R |
| 2013/0073327 A1* | 3/2013 | Edelberg | G06Q 10/047 705/7.13 |
| 2013/0125778 A1* | 5/2013 | Lacabe | B61B 13/00 104/130.01 |
| 2014/0088872 A1 | 3/2014 | Linde et al. | |
| 2014/0104081 A1* | 4/2014 | Cross | G08G 9/00 340/989 |
| 2014/0288821 A1* | 9/2014 | Modica | G06Q 50/30 701/465 |
| 2015/0123823 A1* | 5/2015 | Barnes | G08G 1/123 340/994 |
| 2015/0339928 A1* | 11/2015 | Ramanujam | G08G 1/202 701/23 |
| 2016/0116293 A1 | 4/2016 | Grover et al. | |
| 2016/0189067 A1 | 6/2016 | Law et al. | |
| 2016/0189098 A1 | 6/2016 | Beaurepaire et al. | |
| 2016/0334236 A1 | 11/2016 | Mason et al. | |
| 2016/0370194 A1* | 12/2016 | Colijn | G01C 21/343 |
| 2017/0300049 A1 | 10/2017 | Seally | |
| 2018/0075738 A1 | 3/2018 | Van Egmond | |
| 2018/0136655 A1 | 5/2018 | Kim et al. | |

FOREIGN PATENT DOCUMENTS

| | | |
|---|---|---|
| CN | 103492968 | 1/2014 |
| CN | 104007764 | 8/2014 |
| CN | 105446343 | 3/2016 |
| EP | 2942250 | 11/2015 |
| WO | WO 2016-183525 | 11/2016 |

OTHER PUBLICATIONS

International Search Report and Written Opinion for International Patent Application No. PCT/US2018/036685 dated Oct. 1, 2018.
International Search Report and Written Opinion for International Patent Application No. PCT/CN2017/080591 dated Jul. 11, 2017.
Serban et al., "A security analysis of the ETSI ITS vehicular communications", Radboud University, Nijmegen, 2018.
"Arlington to Roll Out Milo Autonomous Shuttle Pilot Program" by Susan Schrock, posted Aug. 11, 2017.
Auto Connected Car News, posted Lynn Walford, posted Sep. 2014.
"Automated Road Vehicles", presented by R.E. Johnson Consulting.
"Chevrolet's Shanghai EN-V 2.0 Carsharing Program is a Hit", May 24, 2017, by Steve Hanley.
"Can Frisco's new fleet of autonomous vehicles help people get used to idea of a driverless future?", Melissa Repko, Jul. 29, 2018.
EasyMile EZ1, from Wikipedia, last edited Jan. 17, 2019.
Evaluation of Automated Vehicle Technology for Transit—2016 Update, Final Report, Apr. 2016.
NREL, "Automated Vehicles in Public Transit Service", 5th Automated Vehicles Symposium Transit and Shared Mobility Breakout Session, Stanley E. Young & Peter Muller Jul. 17, 2016.
"What is Autotren?", http://www.modutram.com/eng/.
7StarLake, Driverless Shuttle, EZ10, May 12, 2017.
AT @ MCS @ TU/e, overview of automotive technology (AT) activities within the department of Mathematics:and Computer Science (MCS) of the Endhoven University of Technology.
CYBERCARS2 Project—Contract No. 028062, Information Society Technology, Feb. 22, 2009.
Amditis, Automated Road Transport Systems in CityMobil2 project, "Cities demonstrating cybernetic mobility", www.citymobil2.eu, Oct. 2016.

\* cited by examiner

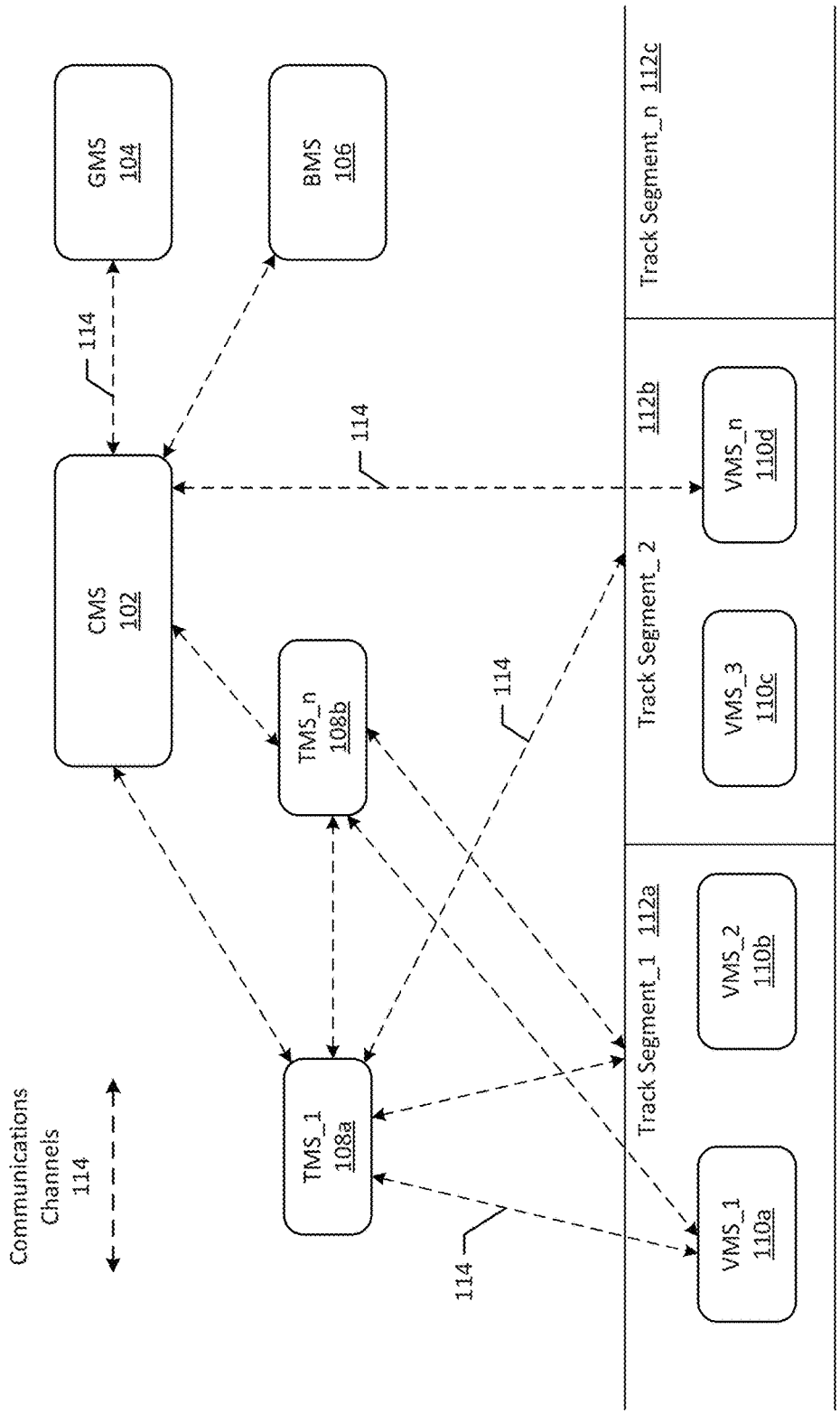

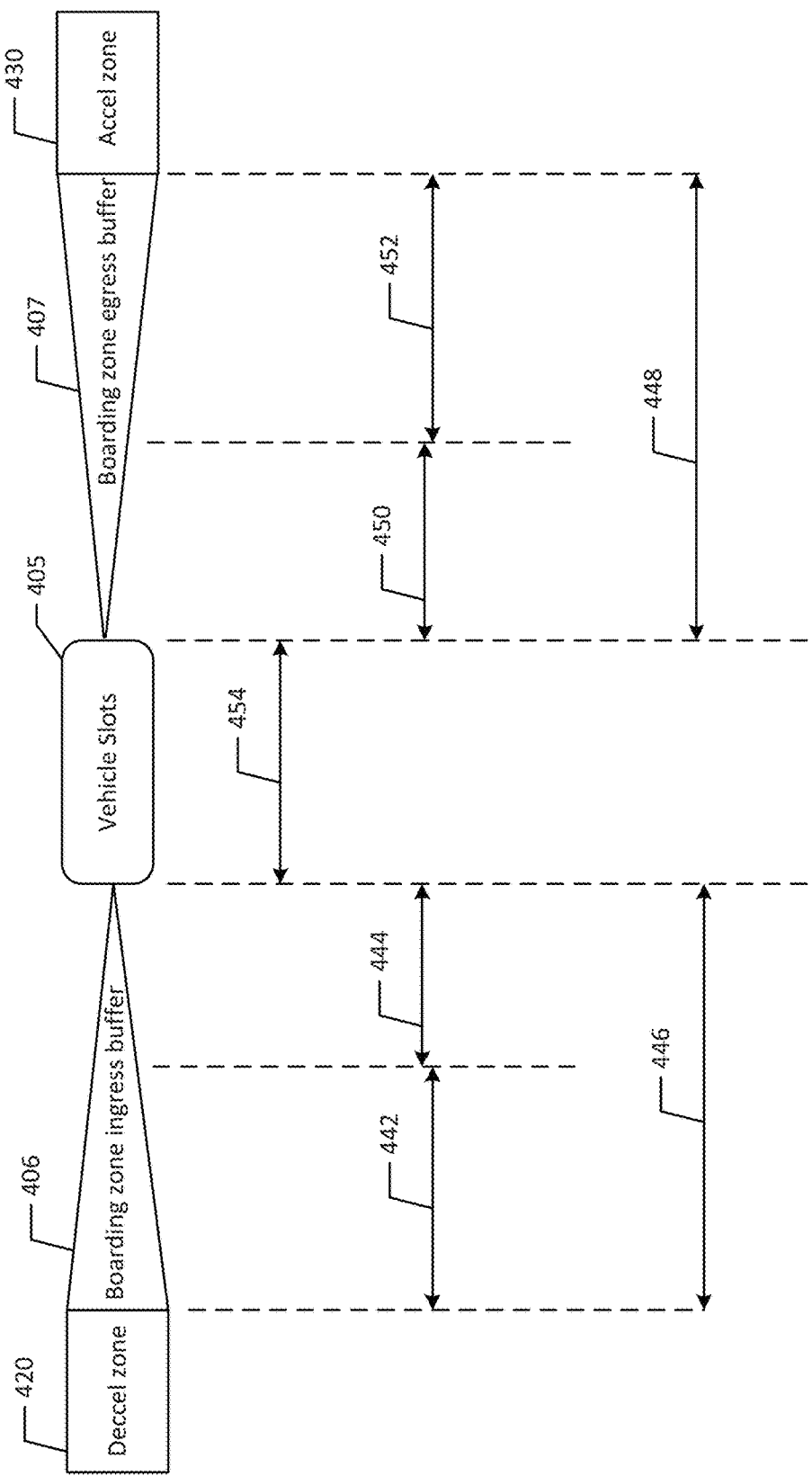

AUTONOMOUS VEHICLE SYSTEM EMPLOYING TIME DOMAIN DYNAMIC BUFFERS WHEN MATCHING PASSENGERS AND VEHICLES

PRIORITY CLAIM

This application claims priority to and the benefit as a non-provisional application of U.S. Provisional Patent Application Ser. No. 62/517,607, entitled "Autonomous Vehicle System Employing Time Domain Dynamic Buffers When Matching Passengers and Vehicles", filed Jun. 9, 2017, the entire contents of which is hereby incorporated by reference and relied upon.

BACKGROUND

Transit systems include mass transit systems and private transportation, such as taxis or personal vehicles. Autonomous vehicles, such as personalized autonomous automobiles are advancing rapidly. However, in highly congested urban areas such vehicles may make at most limited improvements in transportation because of the overall congestion, particularly when there are highly congested chokepoints such as bridges, tunnels, and areas with extremely high density and large amounts of people arriving or departing at similar times in a small geographic area, such as rush hour in busy business district, sporting or entertainment events, etc. Conventional mass transit systems such as commuter rail and subway systems provide high capacity on planned routes but have extremely high infrastructure costs, and provide limited flexibility. Light rail and similar systems provide a solution for some contexts, but still have high costs and may not have high enough capacity to address demand in extremely congested areas.

SUMMARY

The present disclosure provides new and innovative systems and methods for matching passengers and vehicles to address the shortcomings of current on demand transportation services. The systems and methods may help to maintain constant vehicle flow. In an example, a system includes a plurality of at least partially autonomous vehicles, a plurality of interconnected roadways having a plurality of track segments, and embarkation area, and a control system. The roadways preferably have at least partially separated lanes and the roadways are optionally grade separated. The embarkation area includes a plurality of embarkation slots where passengers can board the vehicles. The embarkation area is connected to at least one of the plurality of track segments, allowing the vehicles to travel to and from the embarkation area to the at least one of the plurality of track segments. The control system is configured to coordinate a continuous flow of the plurality of vehicles on the track segments. Groups of vehicles depart from the embarkation area to the at least one of the plurality of track segments in coordinated groups.

In another example, a system includes a plurality of at least partially autonomous personal transportation vehicles, a plurality of interconnected, and preferably dedicated roadways having a plurality of track segments, and a control system configured to coordinate a continuous flow of the plurality of vehicles on the track segments. The plurality of roadways have an embarkation area including a plurality of embarkation slots where passengers can board the vehicles. Additionally, the embarkation area is connected to at least one of the plurality of track segments, allowing the vehicles to travel to and from the embarkation area to the at least one of the plurality of track segments. Groups of vehicles depart from the embarkation area to the at least one of the plurality of track segments in coordinated groups.

In one example, a control system includes a memory, at least one processor in communication with the memory, and at least one controller executing on the at least one processor. The at least one controller is configured to assign a group of vehicles to a plurality of vehicle slots where passengers can board the vehicles, identify passengers traveling through a passenger boarding zone, the passenger boarding zone adjacent to the plurality of vehicle slots, match the passengers with respective vehicles from the group of vehicles, receive an indication that the passengers have boarded the respective vehicles, and responsive to the indication, coordinate departure of at least a subset of the group of vehicles from the vehicle slots back into a continuous flow of vehicles.

In another example, a control system includes a memory, at least one processor in communication with the memory, and at least one controller executing on the at least one processor. The controller is configured to assign a coordinated group of vehicles to a plurality of vehicle slots where passengers can board the vehicles, identify passengers traveling through a passenger boarding zone, the passenger boarding zone adjacent to the plurality of vehicle slots, and match the passengers with respective vehicles from the coordinated group of vehicles. Additionally, the controller is configured to receive and indication that the passengers have boarded the respective vehicles, and responsive to the indication, coordinate departure of at least a subset of the coordinated group of vehicles from the vehicle slots back into a continuous flow of vehicles.

In another example, a method includes assigning a coordinated group of vehicles to a plurality of vehicle slots where passengers can board the vehicles, identifying passengers traveling through a passenger boarding zone, the passenger boarding zone adjacent to the plurality of vehicle slots, matching the passengers with respective vehicles from the coordinated group of vehicles, receiving an indication that the passengers have boarded the respective vehicles, and responsive to receiving the indication, coordinating a departure of at least a subset of the coordinated group of vehicles from the vehicle slots back into a continuous flow of vehicles.

In a further example, a method includes assigning a coordinated group of vehicles to a plurality of vehicle slots where passengers can board the vehicles. Additionally, the method includes identifying passengers traveling through a passenger boarding zone. The passenger boarding zone is adjacent to the plurality of vehicle slots. Additionally, the method involves matching the passengers with respective vehicles from the coordinated group of vehicles, receiving an indication that the passengers have boarded the respective vehicles, and responsive to receiving the indication, coordinating a departure of at least a subset of the coordinated group of vehicles from the vehicle slots back into a continuous flow of vehicles.

In another example, a boarding zone management system includes at least one vehicle slot, a boarding zone vehicle ingress region, a boarding zone vehicle egress region, a passenger boarding zone, and a controller. The vehicle slots(s) are configured to allow a vehicle to park in the vehicle slot. The boarding zone vehicle ingress region is connected to the vehicle slot(s). The vehicle ingress region connects a first track segment of a plurality of track segments of a dedicated roadway to the vehicle slot(s). The boarding zone vehicle egress region is connected to the vehicle slot(s), and the vehicle egress region connects the vehicle slot(s) to a second track segment of the dedicated roadway. The passenger boarding zone has at least one geographically delineated area including one or more outer geo-zones and a vehicle geo-zone. Additionally, the passenger boarding zone is adjacent to the vehicle slot(s) so that passengers can embark and/or disembark from vehicles parked in the at least one vehicle slot. The controller is configured to orchestrate the assignment of the at least one vehicle slot or vehicles entering the at least one vehicle slot to respective passengers traveling through the passenger boarding zone.

In a further example, a boarding zone management system includes at least one vehicle slot configured to allow a vehicle to park in the vehicle slot, and a boarding zone vehicle ingress region connected to the at least one vehicle slot. The vehicle ingress region connects a first track segment of a plurality of track segments of a dedicated roadway to the at least one vehicle slot. The boarding zone management system also includes a boarding zone vehicle egress region connected to the at least one vehicle slot. The vehicle egress region connects the at least one vehicle slot to a second track segment of the dedicated roadway. Additionally, the boarding zone management system includes a passenger boarding zone with at least one geographically delineated area including one or more outer geo-zones and a vehicle geo-zone, the passenger boarding zone adjacent to the at least one vehicle slot so that passengers can embark and/or disembark from vehicles parked in the at least one vehicle slot. The boarding zone management system also includes a controller configured to orchestrate the assignment of the at least one vehicle slot or vehicles entering the at least one vehicle slot to respective passengers traveling through the passenger boarding zone.

In a further example, a system includes a memory, at least one processor in communication with the memory, and at least one controller executing on the at least one processor. The at least one controller is configured to receive a plurality of passenger reservations, designate a coordinated group of logical vehicles in a representation of the continuous flow of vehicles, where the representation of the continuous flow includes location information of the logical vehicles represented as logical blocks, and assign logical vehicles representing physical vehicles from the coordinated group to respective passengers with a confirmed passenger reservation. The controller is also configured to coordinate passenger boarding in the physical vehicles in vehicle slots at a specified boarding zone according to the confirmed passenger reservations, where passenger reservations are confirmed according to capacity in the continuous flow, create logical vehicles representing phantom vehicles in the representation of the continuous flow, and merge the coordinated group of logical vehicles, which represent physical vehicles, into the representation of the continuous flow of vehicles by having the physical vehicles occupy the spaces in the flow allocated to the phantom vehicles.

In another example, a method includes receiving a plurality of passenger reservations and designating a coordinated group of logical vehicles in a representation of a continuous flow of vehicles. The representation of the continuous flow includes location information of the logical vehicles represented as logical blocks. The method also includes assigning logical vehicles representing physical vehicles from the coordinated group to respective passengers with a confirmed passenger reservation and coordinating passenger boarding in the physical vehicles in vehicle slots at a specified boarding zone according to the confirmed passenger reservations. Passenger reservations are confirmed according to capacity in the continuous flow. Additionally, the method includes creating logical vehicles representing phantom vehicles in the representation of the continuous flow and merging the coordinated group of logical vehicles, which represent physical vehicles, into the representation of the continuous flow of vehicles by having the physical vehicles occupy the spaces in the flow allocated to the phantom vehicles.

In a further example, a method includes receiving a plurality of passenger reservations and designating a coordinated group of logical vehicles in a representation of a continuous flow of vehicles. The representation of the continuous flow includes location information of the logical vehicles represented as logical blocks. The method also includes assigning logical vehicles representing physical vehicles from the coordinated group to respective passengers with a confirmed passenger reservation and coordinating passenger boarding in the physical vehicles in vehicle slots at a specified boarding zone according to the confirmed passenger reservations. The passenger reservations are confirmed according to capacity in the continuous flow. Additionally, the method includes creating logical vehicles representing phantom vehicles in the representation of the continuous flow and merging the coordinated group of logical vehicles, which represent physical vehicles, into the representation of the continuous flow of vehicles by having the physical vehicles occupy the spaces in the flow allocated to the phantom vehicles.

In a further example, a trip reservation system includes a memory, at least one processor in communication with the memory; and at least one controller executing on the at least one processor. The controller is configured to receive a booking request from a passenger including passenger and journey information, which includes a departure zone and an arrival zone. The controller is also configured to calculate the availability of an embarkation slot and a disembarkation slot for the passenger, create a route-journey information set to instantiate the booking request as a reservation for the passenger, and match a phantom vehicle to a physical vehicle such that the physical vehicle is designated for the route-journey information set.

In a further example, a method includes receiving a booking request from a passenger including passenger and journey information. The journey information includes a departure zone and an arrival zone. Additionally, the method includes calculating the availability of an embarkation slot and a disembarkation slot for the passenger, creating a route-journey information set to instantiate the booking request as a reservation for the passenger, and matching a phantom vehicle to a physical vehicle such that the physical vehicle is designated for the route-journey information set.

In a further example, a control system for a transportation system having a plurality of interconnected, and preferably dedicated roadways, having a plurality of track segments and an embarkation area having at least one vehicle slot, where the control system includes a memory, at least one processor in communication with the memory, and at least one controller executing on the at least one processor. The at least one controller includes a central management controller, a plurality of track management controllers, and a boarding management controller, where each of the plurality of track segments being assigned to a respective track management controller. The central management controller is configured to communicate with the plurality of track management controllers and the boarding management controller to monitor a continuous flow of a plurality of vehicles on the plurality of roadways and the embarkation area. Additionally, the track management controllers are configured to communicate with their respective track segments and the plurality of vehicles occupying respective track segments. The embarkation area is assigned to the boarding management controller, and the boarding management controller is configured to match vehicles with respective passengers traveling through a passenger boarding zone towards the at least one vehicle slot based on information received from the central management controller.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 1A and 1B illustrate a system overview of a central management system, according to an example embodiment of the present disclosure.

FIG. 4B illustrates deceleration/acceleration zones and buffers in proximity to a vehicle slot.

DETAILED DESCRIPTION OF EXAMPLE EMBODIMENTS

Figure 1B:
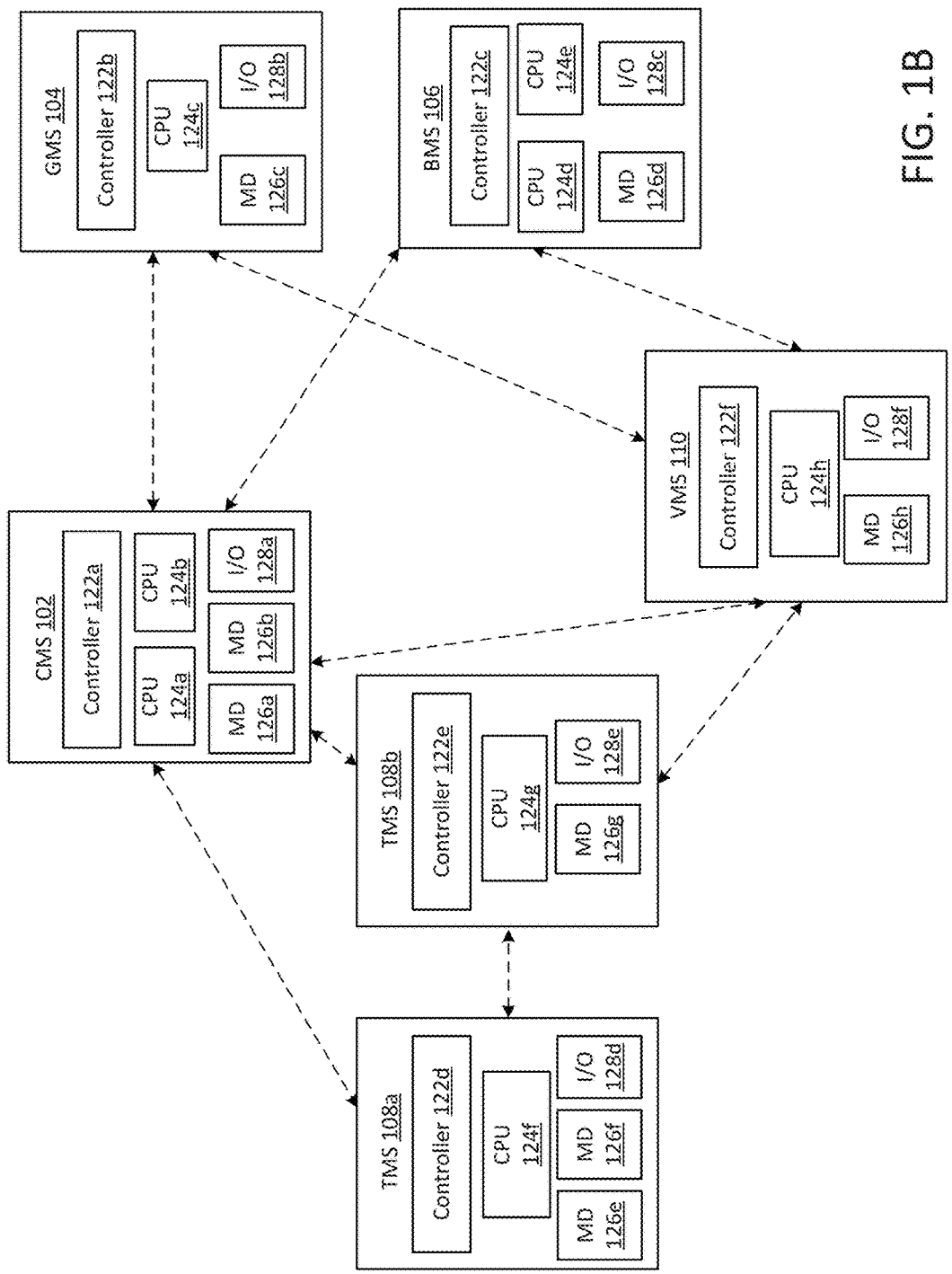

As transport systems become more autonomous, the current queueing systems, for example, where passengers wait at physical locations for the transport modes availability, are becoming less attractive for the stakeholders involved. For example, passengers, cities, operators, and financiers are looking to leverage the benefits of autonomy to improve the experience by reducing friction (e.g., delays, bottlenecks, waiting periods) as well as reducing the costs associated with the transport systems.

The use of distributed boarding has been associated with on demand services, such as Uber, Lyft, Taxi services, and the like. These on demand services involve making a request and providing a transport resource from a pool of such resources (usually cars) to satisfy the request. This approach may be sufficient for low capacity systems, where up to two thousand people per hour per corridor are transported, however, the on demand services are insufficient to meet the demands and needs of a high capacity urban transport setting. For example, a system capable of providing capacity for over two thousand people per hour corridor is needed.

The present disclosure may provide a high capacity autonomous transport system for passengers and/or freight. Vehicles may be right-sized to the typical single passenger load in urban traffic on right-sized, light weight and modular infrastructure. Vehicles may operate on a network of one or several trunk routes, which interconnect with themselves as well as feeder routes. This disclosure is generally related to the transportation system disclosed in application Ser. No. 15/908,406, filed on Feb. 28, 2018, which claims the benefit of Application No. 62/465,088, filed on Feb. 28, 2017.

To help achieve high capacity, it may be quite useful to protect the continuous flow of vehicular traffic on the routes by junction free route design incorporating underpasses and overpasses, or redirection of competing traffic modes to other grades.

The system may provide decentralized and off-line boarding zones for passenger ingress and egress. Vehicle slots or vehicle slots sets adjacent a passenger boarding zone may be connected to the main routes via on and off ramps, which include acceleration, deceleration and buffering space.

Contrary to traditional urban transport systems, the systems of the present disclosure may add capacity simply by adding additional traffic space. Each additional vertical traffic space of approximately 1.4 m increases the capacity along that route by approximately 10,000 people per direction per hour. Modular, prefabricated infrastructure elements may be provided to allow for cost effective, fast track construction and capacity upgrades.

A decentralized software architecture may provide dynamic synchronization of traffic flows at intersections, boarding zones and other key nodes of the network without central traffic management or slot allocation.

The system may provide on-demand transportation services to users, with users requesting rides and freight transport services as required. This facilitates off-line queuing of passengers in a high capacity urban transport environment previously not feasible, allowing passengers to spend any necessary waiting time productively and only presenting at the boarding zone once a vehicle for their ride is available. This contrasts with legacy high capacity urban transport systems with on-line queuing, where passengers arrive at stations unannounced then queuing to board the desired vehicle.

The present disclosure includes systems and methods defining an integration of distributed boarding zones, which are specific geographical destinations, as dynamic buffers for a high capacity transport solution. The capacity management of the system incorporates these distributed boarding zones for each of the individual systems comprising that capacity management, such as scheduling, reservations, and supporting operating management.

In any autonomous transport system the ingress and egress of passengers from vehicles is a core consideration. Techniques are disclosed that describe the integration of such ingress and egress into system operations that provide improved capacity for such a system, while effectively managing the expectations and behaviors of the passengers involved. Control systems that achieve this integration are also described.

Optimizing traffic flow may involve the creation, in the time domain, of buffers through distributed boarding zones that are integrated with the reservation, scheduling and planning capabilities of an autonomous transport system employing continuous flow. These buffers may include vehicles buffers and passenger buffers at both entry to and exit from the system. This disclosure incorporates a novel approach to the provision of high density urban transport though the use of autonomous vehicles and distributed boarding zones.

In some embodiments, there may be many vehicles in motion simultaneously in a boarding zone, and so different strategies for maneuvering the vehicles can have a substantial effect on the performance of the zone. For example, this may be measured using a variety of metrics, including the number of passengers per hour that the zone can cycle into and out of the system, number of vehicles that enter and exit such a zone, dwell time of vehicles in a zone, passenger boarding/de-boarding times and the like.

By employing a strategy of coordinated embarkation, zone performance may be improved. With coordinated embarkation, vehicles may arrive and depart in groups, with much higher throughput than if they were to arrive and depart opportunistically, for example one by one. Coordinated embarkation may be achieved by having vehicles wait just a tad, until sufficient vehicles are ready so that a larger group of vehicles can arrive or depart as a group. The selection of which vehicles are part of the group may be influenced by additional constraints, such as a possible requirement (in one embodiment, where vehicle slots are fairly closely packed) that adjacent vehicles never depart at the same time.

The systems and methods disclosed herein facilitate the coordination of random inputs such as uncoordinated motion of single vehicles and the random and unpredictable loading and unloading times of passengers. These uncoordinated motions of vehicles and passengers are coordinated within boarding zones through the use of buffers. The transition of a vehicle from moving at a constant velocity to being station at a parking spot or vehicle slot and then bag again to a constant velocity involves a progression through different regimes of motion, as well as through different physical regions of a boarding zone.

FIGS. 1A and 1B illustrate a system overview of a central management system ("CMS") 102 communicating with various other control systems. For example, the CMS 102 may communicate with garage management systems ("GMS") 104, boarding zone management systems ("BMS") 106, track management systems ("TMS") 108a and 108b, and vehicle control systems or vehicle management systems ("VMS") 110a, 110b, 110c, 110d.

The CMS 102 may be configured to coordinate a continuous flow of plurality of vehicles, which may each have its own VMS (e.g., 110a-d), on track segments (e.g., 112a, 112b, and 112c). The CMS 102 may coordinate the continuous flow of the plurality of vehicles through communication with the other control and management systems (e.g., TMS, BMS, VMS, GMS) illustrated in FIGS. 1A and 1B. Through this communication, vehicles may be directed to arrive at an embarkation arear from a plurality of interconnected roadways. Similarly, vehicles may be directed to depart from the embarkation area to the plurality of interconnected roadways. The roadways may be dedicated roadways with a plurality of track segments (e.g. 112a, 112b, 112c). As discussed in more detail below, the embarkation area may include a plurality of embarkation slots or vehicle slots where passengers can board the vehicles. In an example, vehicles (e.g., coordinated groups of vehicles) may depart an embarkation area and travel to a disembarkation area before reentering a continuous flow of vehicles. In another example, the coordinated groups of vehicles may disembark from the embarkation area to reenter the continuous flow.

In an example, the management systems may communicate via communication channels 114. The communication channels 114 may be normal communication channels or exception enforced communications.

Each management system may include a controller (e.g., controllers 122a-f). For example, CMS 102 may include controller 122a, GMS 104 may include controller 122b, BMS 106 may include controller 122c, TMS 108a may include controller 122d, TMS 108b may include controller 122e, and VMS 110 may include controller 122f. Additionally, each management system may in turn include one or more physical processors (e.g., CPU 124a-h) communicatively coupled to memory devices (e.g., MD 126a-h) and input/output devices (e.g., I/O 128a-f). As used herein, physical processor or processor refers to a device capable of executing instructions encoding arithmetic, logical, and/or I/O operations. In one illustrative example, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device (e.g., MD 126*a*-*h*) refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Processors may be interconnected using a variety of techniques, ranging from a point-to-point processor interconnect, to a system area network, such as an Ethernet-based network. Local connections within each node, including the connections between a processor and a memory device may be provided by one or more local buses of suitable architecture, for example, peripheral component interconnect ("PCI").

In some example embodiments, vehicles travel over at least partially separated interconnected roadways made up of a plurality of roadway segments of differing types.

Some example embodiments described in the present disclosure include a transportation system for the general public with electrically powered vehicles configured to partially operate on at least a separated roadway where such cooperating vehicles have right of way. A separated roadway may include roadway segments that are grade separated or logically separated. A grade separated roadway may include roadway segments that provide at least one form of physical isolation from the surrounding area sufficient to prevent and/or deter other vehicles, people, animals (for example dogs, cats and similar sized wildlife), detritus, balls or toys and the like form entering the roadway. A logically separated roadway may provide roadway segments where there is an identified separation, but where the separation does not impose at least one form of physical isolation from surrounding areas. For example, a logically separated roadway may include specific roadway segments that are designated for a use by the system such as a dedicated lane on a multi-lane roadway, or a repurposed bike lane. Roadway segments may be further characterized by their function and use, e.g. functional characterizations of trunk, distributor, and boarding zone roadway segments, and use-based characterizations (dedicated or integrated) that describe the types of vehicles permitted to operate on the roadway segment, e.g. a roadway segment may permit only transportation system specific vehicles (such as cooperative or gauge limited vehicles) on dedicated segments, or transportation system specific vehicles may intermingle with general vehicle traffic on integrated and shared roadway segments. Integrated roadways are comprised of roadway segments that are associated with at least one area controller, and have mixed traffic between transportation system specific vehicles and general vehicle traffic. For example, an integrated roadway may include roadway sensors and/or area controllers that communicate with transportation system specific vehicles. A shared roadway is a roadway segment for which there is no associated area controller and/or management system. For example, a shared roadway may include roadway segments that may be used by mixed traffic (e.g., transportation system specific vehicles and general vehicle traffic) without the presence of roadway sensors and/or area controllers. Sets of roadway segments may be referred to as a "line", e.g. a trunk line.

Roadway segments may be organized such that they are interconnected to form linear, branching, network, or mesh roadway topologies.

Example vehicles, when in transit, may be continuously moving in normal operations using a combination of trunk, distributor and boarding zone roadway segments to move passengers from their selected origin to their destination. Trunk roadway segments are typically characterized as having higher capacity, generally providing higher throughput and vehicle velocities than distributor roadway segments. Distributor roadway segments typically provide lower capacity, throughput and vehicle velocities. Boarding zone segments typically provide the locations called slots where passengers may embark and disembark vehicles. In an example, a vehicle may be half the width of traditional vehicles and have an approximate width of 1.0 meters, an approximate length of 3.0 meters, and an approximate height of 2.0 meters.

Figure 2:
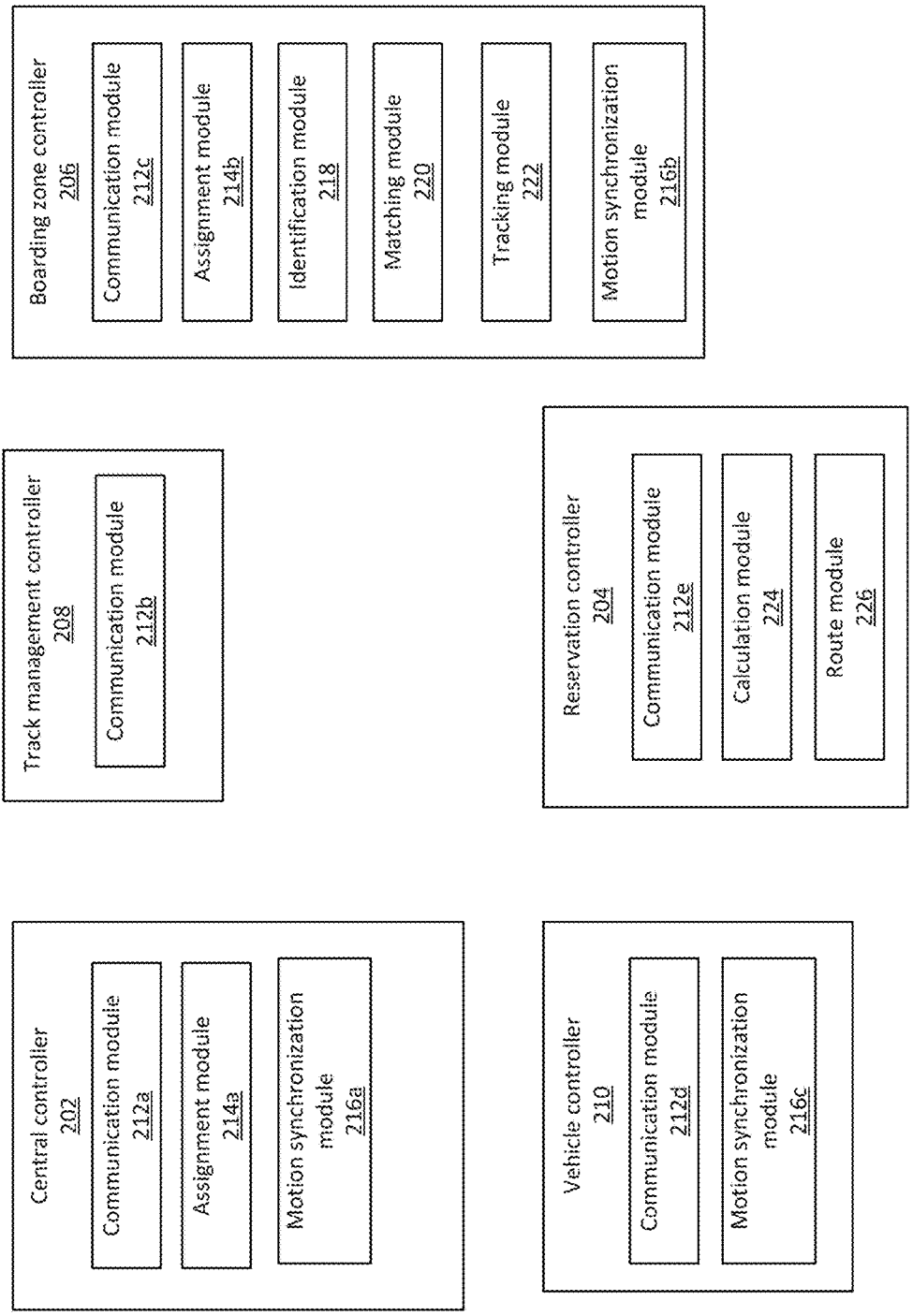
FIG. 2 illustrates a block diagram of example controllers, according to example embodiments of the present disclosure.

CMS 102 may include a controller, such as central controller 202 as illustrated in FIG. 2. For example, the central controller 202 may include a communication module 212*a* that sends and receives information to various other control and management systems (e.g., TMS 108, BMS 106, VMS 110, GMS 104) and/or their respective controllers (e.g., controllers 122*a*-*f* and/or controllers 202, 204, 206, 208, 210). The central controller 202 may include an assignment module 214*a* that is configured to assign vehicles (e.g., coordinated groups of vehicles) to a plurality of vehicle slots. For example, the assignment module 214*a* may send instructions to a BMS (e.g., BMS 106) and/or a boarding zone controller 206 to coordinate the assignment of vehicles to vehicle slots. The assignment module 214*a* may orchestrate the assignment of a vehicle slot and/or vehicles entering the vehicle slot to respective passengers. For example, the assignment module 214*a* may communicate with the BMS 106 and/or boarding zone controller 206 to orchestrate assignments of vehicles and/or vehicle slots to respective passengers traveling through a passenger boarding zone, preferably the vehicle zone of the passenger boarding zone (e.g., a boarding zone at a designated embarkation area).

The central controller 202 may communicate with other management systems and controllers (e.g., boarding zone controller 206 and/or track management controllers 208) to monitor a continuous flow of vehicles on a plurality of roadways and embarkation/disembarkation areas.

In an example, the TMS 108 may include a track management controller 208 that corresponds to one or more of the plurality of track segments. The track management controller 208 may be configured to communication with the plurality of vehicles within its respective track segments. For example, the track management controller 208 may include a communication module 212*b* that sends and receives information from one or more of the CMS 102, other track management systems (e.g., TMS 108*a*, 108*b*) and/or controllers, track segments, and/or VMS 110 (e.g., VMS 110*a*, 110*b*). In an example, multiple track segments 112 may be assigned to a single track management system 108 and/or track management controller 208. Additionally, a TMS 108 may include multiple track management controllers 208. For example, a TMS 108*a* may be assigned to multiple track segments 112*a*, 112*b*, which are each controlled by different track management controllers 208. The track management controllers 208 may be configured to match a phantom vehicle in the continuous flow with a passenger booking request such that the phantom vehicle becomes designated for a route-journey information set associated with the passenger.

The BMS 106 may include a boarding zone controller ("BZC") or boarding management controller 206. The boarding zone controller 206 may be configured to match vehicles with respective travelers traveling through a boarding zone towards a vehicle slot based on information received from other controllers, such as the central management controller 202. Similar to the controllers discussed above, the BZC 206 may include a communication module 212c that enables communication to other controllers, management systems, etc. The BZC 206 may also include an assignment module 214b that enables assignment of vehicles (e.g., coordinated groups of vehicles) to a plurality of vehicle slots. The boarding zone controller 206 may also include an identification module 218 that is configured to identify passengers traveling through a passenger boarding zone (discussed in more detail below). Additionally, BZC 206 may include a matching module 220 that matches passengers with respective vehicles from the coordinated groups of vehicles. The matching module 220 may work in conjunction with the identification module 218 to match identified passengers with respective vehicles based on positions of the respective passengers in a passenger boarding zone relative to the respective vehicles. For example, the assignment module 214b and identification module 218 may identify and match passengers based on identity information and/or location information received by the BZC 206 communication module 212c. For example, based on the information received, the matching module 220 may determine the proximity of passengers to respective vehicles and/or vehicle slots. As discussed in more detail below, the BMS 106 and/or boarding zone controller 206 may match passengers and vehicles based on proximity, estimated arrival times (e.g., by calculating passenger vectors), and/or traffic patterns. These estimates and calculations may be determined by the matching module 220 of the boarding zone controller 206 based on information received from the various other modules, controllers, and management systems. Additionally, the BMS 106 and/or BZC 206 may track a passenger's movement through a boarding zone via a tracking module 222.

As discussed above, the assignment module 214b of the boarding zone controller 206 orchestrates the assignment of a vehicle slot and/or vehicles entering the vehicle slot to respective passengers. For example, the assignment module 214b may communicate with the BMS 106 and/or boarding zone controller 206 to orchestrate assignments of vehicles and/or vehicle slots to respective passengers traveling through a passenger boarding zone (e.g., a boarding zone at a designated embarkation area).

After passengers have boarded the respective vehicles, the boarding zone controller 206 (e.g., communication module 212c of the BZC 206) may receive an indication that the passengers have boarded their respective vehicles. After the BZC 206 receives the indication that the passengers have boarded their respective vehicles, the BZC 206 may coordinated with various other management systems (e.g., CMS 102, TMS 108, VMS 110, GMS 104) and/or controllers 122a-e, 202, 204, 206, 208, 210 to coordinate the departure of a set of vehicles from vehicle slots back into a continuous flow of vehicles. For example, the BZC 206 may communicate, using the communication module 212c, to other controllers and coordinate the departure of a coordinate group of vehicles or a subset of the coordinated group of vehicles back into the continuous flow.

Additionally, the BZC 206 may coordinated with various other management systems (e.g., CMS 102, TMS 108, VMS 110, GMS 104) and/or controllers 122a-e, 202, 204, 206, 208, 210 to coordinate the arrival of a set of vehicles from the continuous flow to vehicle slots at an embarkation area and/or disembarkation area. For example, the BZC 206 may communicate, using the communication module 212c, to other controllers and coordinate the arrival of the coordinate group of vehicles or a subset of the coordinated group of vehicles to a plurality of vehicle slots.

In an example, a VMS 110 (e.g., VMS 110a-d) may include a vehicle controller 210. The vehicle controller 210 may include a communication module 212d, similar to the communication modules discussed above. Additionally, each of the central controller 202, Boarding zone controller 206, and vehicle controller 210 may include a motion synchronization module 216a-c that is configured to synchronize the motion of a coordinated group of vehicles in buffers (e.g., physical buffers) to and from the continuous flow of vehicles. For example, the motion synchronization modules 216a-c may use buffers (e.g., time buffers) when coordinating the arrival and/or departure of the coordinated group of vehicles to and from the plurality of vehicle slots to exit or reenter the continuous flow of vehicles.

Additionally, one or more of the motion synchronization modules 216a-c may allocate phantom vehicles in the continuous flow. For example, through communication with the CMS 102, TMS 108, BMS 106, VMS 110, and various track management systems, phantom vehicles may be allocated in the continuous flow such that physical vehicles may be merged into the continuous flow (e.g., by the motion synchronization modules) by occupying spaces in the continuous flow allocated to the phantom vehicles. For example, a phantom vehicle in the continuous flow may be allocated to the physical vehicle such that the physical vehicle may merge into the continuous flow. In another example, merging may be achieved by increasing the separation between vehicles in the continuous flow to allow a vehicle departing an embarkation area to merge with the continuous flow of vehicles. For example, the CMS 102 and/or central controller 202 may communicate with the VMS 110 and TMS 108 to increase vehicle spacing or separation.

Figure 3A:
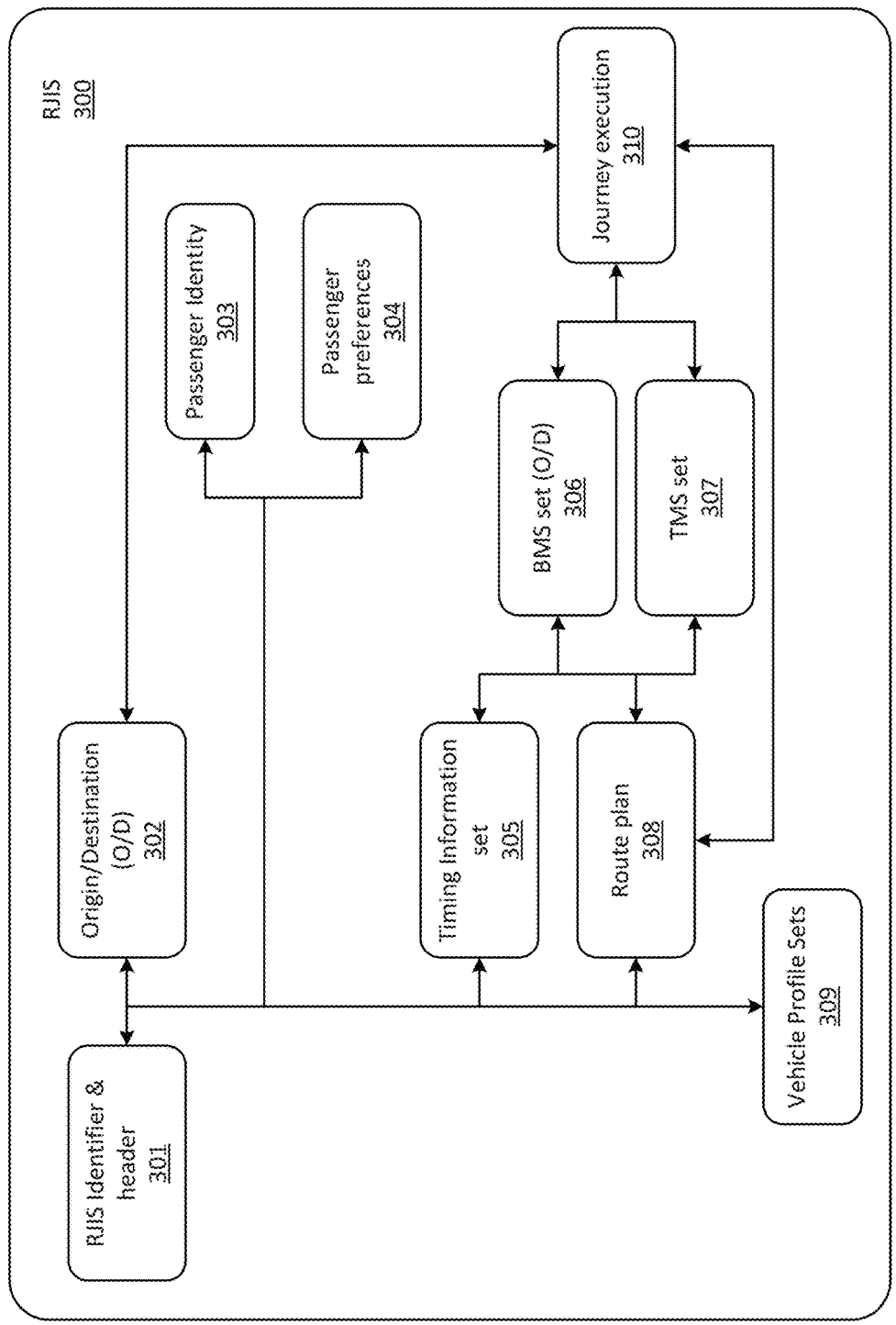
FIGS. 3A and 3B illustrate a block diagram of example route-journey information sets, according to embodiments of the present disclosure.
Figure 3B:
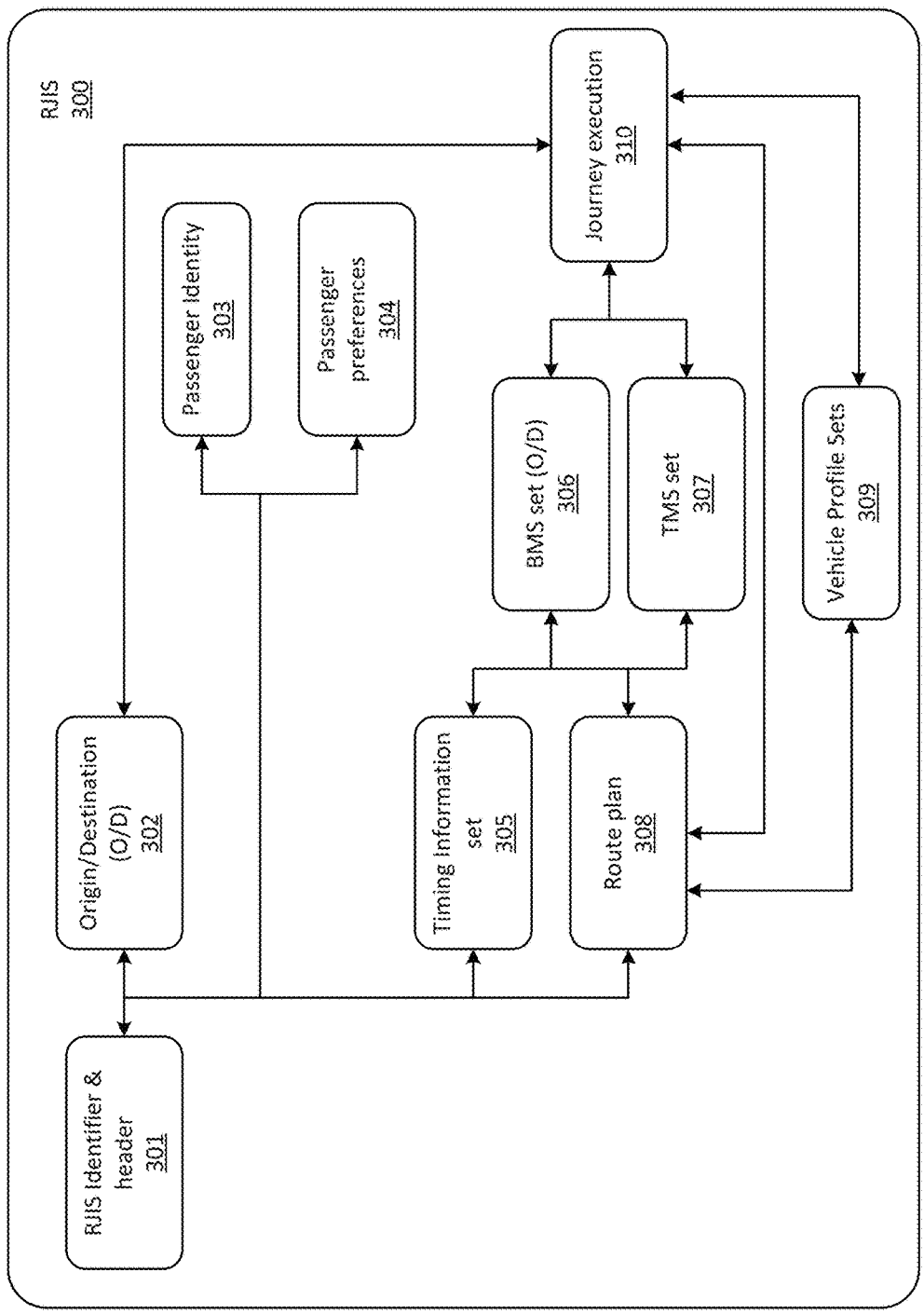

The CMS 102 from FIGS. 1A and 1B may also communicate with a reservation controller 204. The reservation controller 204 may include a communication module 212e that receives booking requests from passengers, e.g., via a user device (e.g., smartphone). The request may include passenger and journey information, such as where the passenger would like to depart from (e.g., departure zone) and arrive at (e.g., arrival zone). The reservation controller 204 may also include a calculation module 224 that is configured to calculate the availability of an embarkation slot and a disembarkation slot for the passenger. In an example, checking the availability of an embarkation slot and/or a disembarkation slot may include calculating one or more vehicle buffers and passenger specific information, such as passenger travel times and/or rate of travel. The calculated vehicle buffers may be an egress buffer at a departure zone and an ingress buffer at an arrival zone. Additionally, a route module 226 may create a route-journey information set (as illustrated in FIGS. 3A and 3B) to instantiate the booking request as a reservation for the passenger. In an example, the confirmed booking request (e.g., reservation) may be communicated to a passenger by the communication module 212e to a user device, such as a smartphone. Through communication with other management systems and controllers, a physical vehicle may be designated for the route-journey information set, which may include a departure zone and an arrival zone.

The various management systems described above (e.g., CMS 102, TMS 108, BMS 106, VMS 110) and associated controllers (e.g., central controller 202, track management controller 208, boarding zone controller 206, vehicle controller 210) may work in conjunction with a booking, reservation and matching system ("BRMS") and/or a reservation controller 204 to designate a coordinated group of logical vehicles in a representation of a continuous flow of vehicles. For example, the CMS 102 and/or BRMS may store a representation of the continuous flow which may include location information of the logical vehicles represented as logical blocks. Additionally, the BRMS may assign logical vehicles representing physical vehicles from the coordinated group to respective passengers with a confirmed passenger reservation. The BRMS may communicate with various management systems and controllers to convey the assignment information to the BMS and boarding zone controller 206.

Similarly, the BMS 106 and/or boarding zone controller 206 may coordinate passenger boarding in the physical vehicles in vehicle slots at a specified boarding zone according to confirmed passenger reservations (e.g., according to information supplied by the BRMS). Additionally, the various management systems and controllers may communicate to create logical vehicles representing phantom vehicles in the representation of the continuous flow. Similarly, the management systems and controllers may merge the coordinated group of logical vehicles, which represent physical vehicles, into the representation of the continuous flow of vehicles. For example, the logical representation of physical vehicles may occupy spaces in the continuous flow allocated to logical representations of phantom vehicles. The vehicles or vehicle representations may also be stored as coordinates in a coordinate system.

The communication between management systems and controllers may include vehicle motion information. For example, a boarding zone controller or boarding management controller 206 may receive vehicle motion information from a central management controller 202. The vehicle motion information may be provided to the central management controller 202 by a plurality of track management controllers 208.

As discussed herein, the various management systems may utilize dynamic buffers, such as time buffers, when coordinating the departure of vehicles to and from an embarkation area (or optionally a disembarkation area). These time buffers may be adjusted to compensate for traffic patterns, passenger boarding delays, or the like. Time buffer adjustment may enable coordinated groups of vehicles to reenter the continuous flow without disrupting other vehicles traveling in the continuous flow. In an example, time buffers may be adjustable within a range of time. Additionally, time buffers may be adjusted by altering a vehicle velocity such that the vehicle travels through a physical buffer in less time.

Figure 4A:
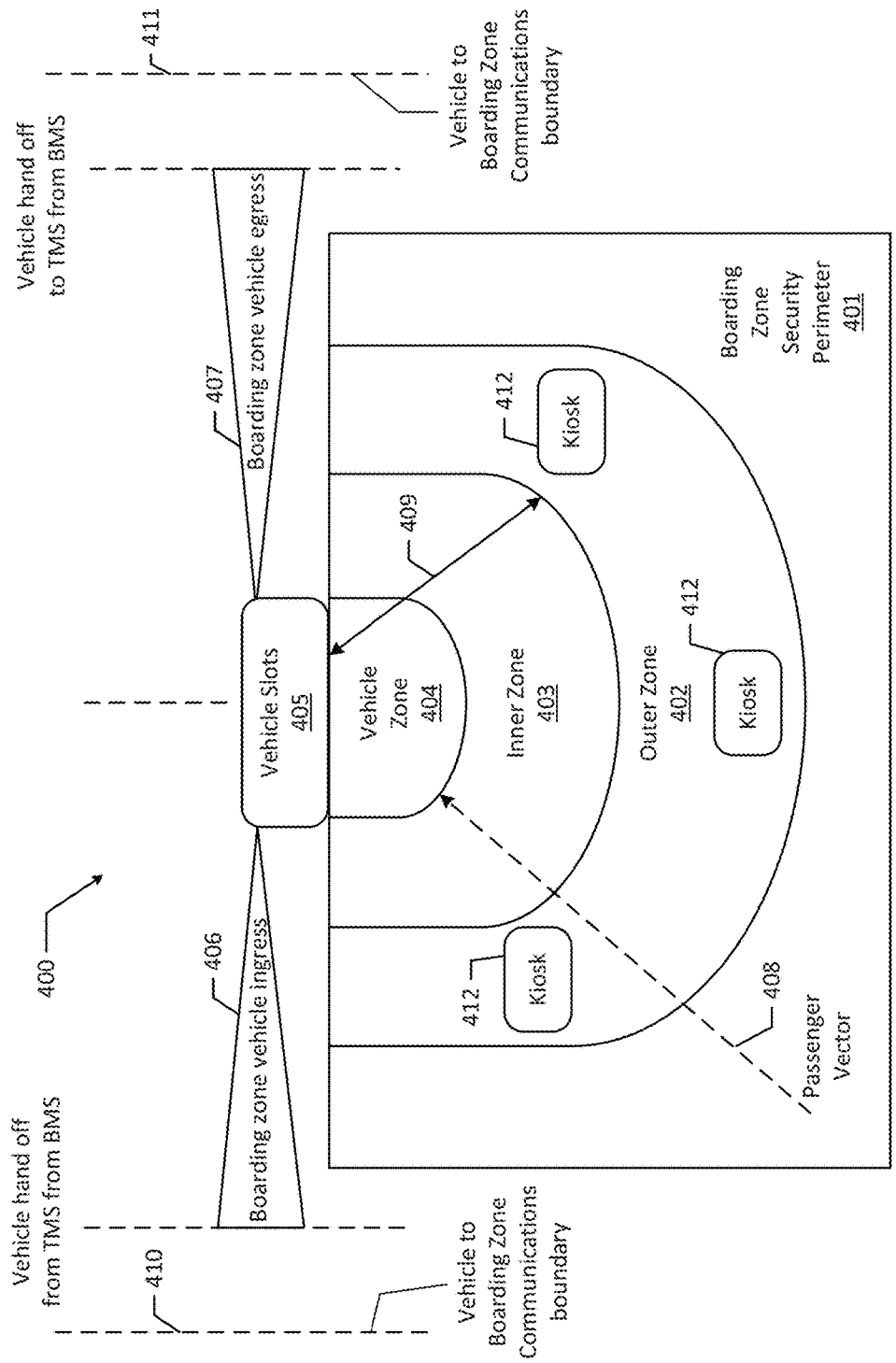
FIG. 4A illustrates an example boarding zone, according to an example embodiment of the present disclosure.

FIG. 4A illustrates an example boarding zone 400. For example, a boarding zone 400 may include one or more vehicle slots 405 that are configured to allow a vehicle to park in the vehicle slot. Additionally, a boarding zone vehicle ingress region 406 and a boarding zone vehicle egress region 407 may be connected to each vehicle slot 405. The boarding zone vehicle ingress region 406 and the boarding zone vehicle egress region 407 connect the track segments of a dedicated roadway to the vehicle slots 405. The boarding zone 400 may also include a passenger boarding zone, which may be a geographically delineated area with one or more outer geo-zones (for example an outer zone 402 and inner zone 403) and a vehicle boarding geo-zone 404. The passenger boarding zone may be adjacent to the vehicle slot 405 so that passengers can embark and/or disembark from vehicles parked or standing in the vehicle slot 405.

As illustrated in FIG. 4A, vehicles may communicate with a boarding zone management system (e.g., BMS 106) and a boarding zone controller (e.g., BZC 206) once they are in proximity with the BMS 106 and/or BZC 206. For example, there may be a communication boundary 410, 411 that vehicle crosses before communicating with a BZC 206. Additionally, a TMS 108 may hand off the vehicle to the BMS 106 once the vehicle approaches a boarding zone vehicle ingress region 406. Similarly, the BMS 106 may hand off the vehicle to the appropriate TMS 108 as the vehicle exits a boarding zone vehicle egress region 407 to a track segment. In an example, a vehicle may be monitored by one or more management systems at any given time such that the CMS 102 has real-time information on the location of each vehicle in the vehicle flow.

It will be appreciated that coordinated embarkation may be facilitated by the presence of buffers both ahead of and behind the parking region (e.g., boarding zone vehicle ingress region 406 and boarding zone vehicle egress region 407). The appropriate controllers of vehicles in the parking regions may reconcile the synchronized motion of coordinated embarkation with the potentially unsynchronized flow of vehicles in a high or variable speed stream. Vehicles arrive at a buffer according to the inter vehicle dynamics or other aspects of the constant flow of a high or variable speed stream on the main track segments. The order may be determined by the vehicles themselves, an ordering algorithm, and/or interactions with the BMS 106. For example, when a buffer has sufficient vehicles to occupy the available parking slots such vehicles may then be orchestrated from the buffer into parking spots in coordinated groups. Similarly, vehicles departing the zone may be coordinated to leave in groups.

If sufficient space is not available, the journey time may be adjusted so that space will be available when a passenger arrives at its destination. Journeys may be pushed out in the order in which they are requested.

As discussed in more detail below, kiosks 412 or other information items may be located in the boarding zone to assist passengers in traveling through the geo-zones.

Boarding Zone Dynamics

In some embodiments, there may be many vehicles in motion simultaneously in a boarding zone (e.g., boarding zone 400). Different strategies for maneuvering the vehicles can have a substantial effect on the performance of the boarding zone. For example, zone performance may be quantified by statistics on a variety of metrics, including the following: a) number of passengers per hour that depart from the zone; b) number of passengers per hour that arrive at the zone; c) number of vehicles per hour that pass through the zone; d) amount of time (e.g., docking duration) for a vehicle to enter the zone and come to a halt at a vehicle slot; e) amount of time (e.g., undocking duration) that a vehicle is in motion between being stationary in a vehicle slot and re-entering the continuous flow; and f) amount of time that a vehicle waits before begging to move after being ready to go. In an example, waiting may be necessitated by the zone's spatial constraints such that vehicles do not run into one another as they maneuver.

Large quantities or groups of vehicles may continuously cycle through different states in a boarding zone (for instance from moving at high speed to being stationary and unloading passengers). In some embodiments, boarding zones use as little overall area as practical with as few lanes as practical, for example a high-speed lane, variable-speed lane and a stopping or standing area. In some embodiments, traffic in boarding zones may be controlled or facilitated by a Boarding Management System (e.g., BMS 106) that is responsible for the operations in a boarding zone.

To prevent overwhelming a boarding zone, the vehicles headed to each boarding zone may be tracked. For example, a vehicle may register with a Boarding Management System (e.g., BMS 106) for a loading zone (e.g., a vehicle slot 405 in the boarding zone managed by the BMS 106) or proxy before beginning its journey. In some embodiments, one or more systems, including a Booking Reservation Management System (e.g., booking, reservation, and matching system (BRMS)) may calculate the bounds, including the time intervals of the buffers and allowing for the passenger time buffers, of the time that a vehicle will arrive at its destination loading zone, and these bounds will converge as the vehicle approaches. For example, the BRMS may calculate of the number (e.g., quantity) of vehicles that arrive at a boarding zone at a point in the future. In some embodiments, BRMS may schedule a route, with a Route-Journey Information Set ("RJIS"), and constrain the start of the journey until the relevant destination zone, as specified in the origin/destination of the RJIS, confirms that a parking space will be available at the time the journey is expected to conclude.

Figure 5:
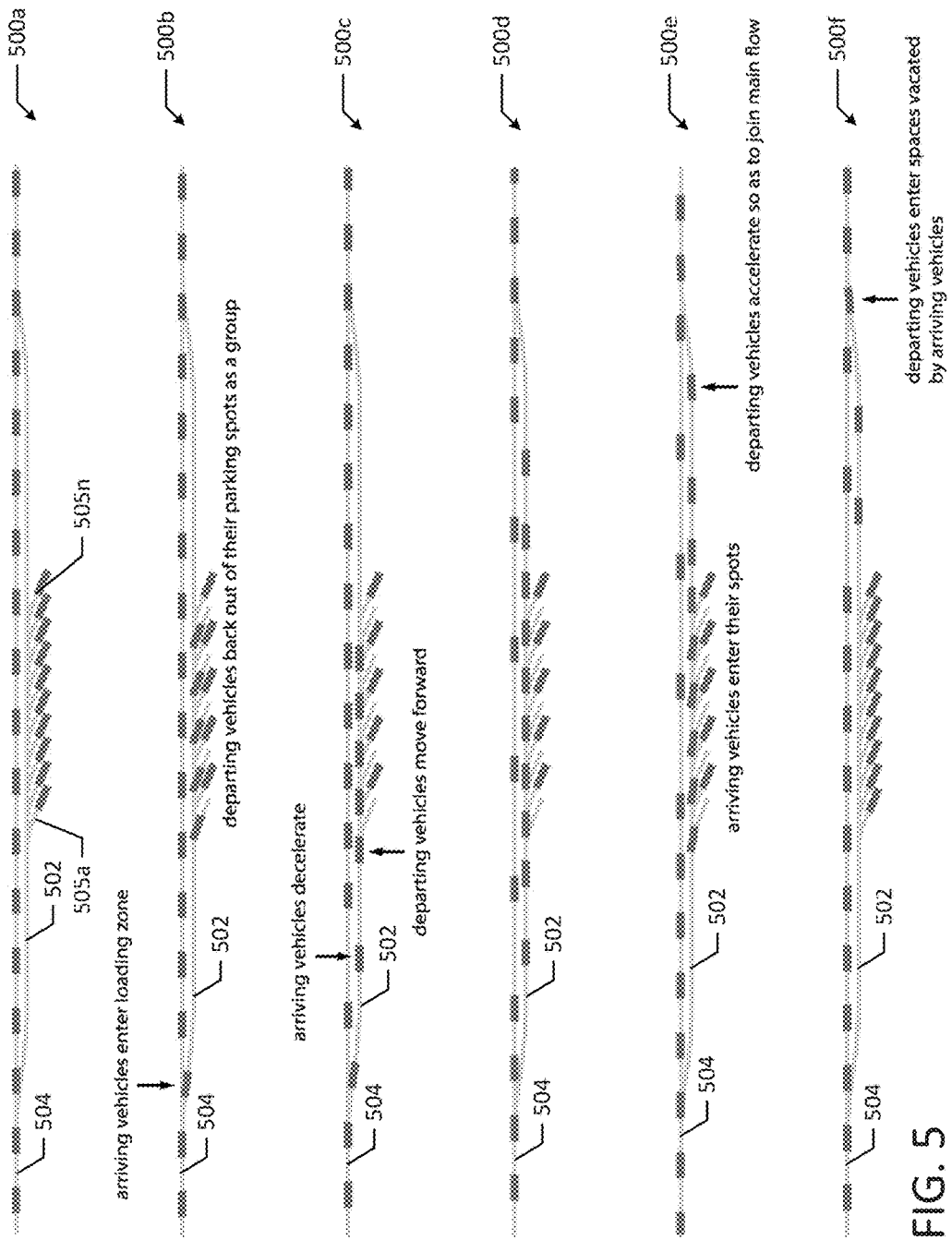
FIG. 5 illustrates vehicles entering and exiting an example boarding zone, according to an example embodiment of the present disclosure.

The rate at which vehicles are able to cycle into and out of a boarding zone depends in part on the layout of the vehicle pathways within the zone. If these pathways are overlapping (in the interest of reducing the zone's spatial footprint), vehicles may have to adjust their motions so as not to collide with other vehicles. An example boarding zone geometry is shown in FIG. 5. In this example boarding zone geometry 500 (shown at various points in time as 500*a-f*), a single lane 502 branches off from a constant flow lane 504, and feeds a number (e.g., quantity) of parking spots or vehicle slots 505 (e.g., vehicle slots 505*a* to 505*n*). Any vehicle moving to or from a parking spot (e.g., vehicle slots 505) travels along this single lane 502. Suppose the parking spots (e.g., vehicle slots 505) are numbered 1 to N. If a vehicle in spot 1 (e.g., vehicle slot 404*a*) pulls out of its parking spot in order to exit the zone, vehicles in all other parking spots (2 to N) wait for the first vehicle to pass before exiting themselves. This exposes a fundamental challenge with loading zones, which we address with a methodology called "coordinated embarkation". In coordinated embarkation, groups of vehicles leave simultaneously. As a result, the time to purge (and reload) a set of vehicles is approximately order N, rather than order $N^2$.

For example, as shown in 500*c*, 500*d*, 500*e*, and 500*f*, the vehicles may be paused in a queue and leave vehicle slots 505 all at the same time such that there is time-based coordination. As previously discussed, the time-based coordination improves efficiency. This time-based coordination may occur as vehicles travel between a buffer (e.g., ingress buffer or egress buffer) and a parking space or vehicle slot 505. For example, coordinated groups of vehicles may be formed as vehicles are traveling from a buffer to a vehicle slot 505 or from a vehicle slot 505 to a buffer. Since the coordinated groups are formed when traveling between vehicle slots and a buffer, the coordinated groups may be demand driven groups that accommodate passenger variability. For example, if a passenger is not ready to depart, that passenger's vehicle may not join a demand driven group allowing the remaining vehicles in the system to "flow" around the waiting vehicle. Specifically, another vehicle may join the demand driven group, for example for a passenger that is ready to depart earlier than expected.

Additionally, by entering and exiting vehicle slots 505 in groups, vehicle maneuvers may be executed in parallel rather than in series, resulting in much greater throughput.

Even though FIG. 5 illustrates both a single lane 502 and a constant flow lane 504, the system may include several variable speed lanes that may be used as either a constant flow lane 504 and/or a single lane 502. Once a lane is designated as a lane 502, buffers may be software controlled and thus are variable by nature, such that different lengths of track or different amounts of time can be allocated to a "buffer zone." The buffers are configured to reconcile the uncoordinated motions coming from the track with the coordinated motions of entering and exiting vehicle slots 505 with high throughput.

The synchronized motions of coordinated embarkation are reconciled with potential asynchronous motions of vehicles in the trunk line by input and output buffers. Input and output buffers are segments of roadway or track that vehicles dribble into (from the trunk line) and exit out of in groups (to the parking spots of a loading zone). For example, as illustrated in FIG. 5, arriving vehicles enter the loading zone as departing vehicles back out of their vehicle slots as a coordinated group (shown in 500*b*). Then, the departing vehicles move forward as shown in 500*c* (e.g., move from vehicle slot into boarding zone egress buffer). As the arriving vehicles enter the empty vehicle slots, the departing vehicles accelerate to join the main flow as shown in 500*e*. In an example, the departing vehicles may enter spaces vacated by the arriving vehicles as shown in 500*f*. For example, spaces may be provided in the continuous flow to a coordinated group by allocating directing a different coordinated group of vehicles in the continuous flow to the embarkation area. In an example, vehicle departure may be based on intended destination of the vehicle, a planned vehicle route, a traffic pattern of the continuous flow, etc.

In some embodiments, a boarding zone may be deployed in any available location, for example the edge of a roadway, however in many circumstances such a zone with comprise a set of dedicated boarding slots or vehicle slots 505 (e.g., vehicle slots 505*a* to 505*n*), such as those shown in FIG. 5.

Vehicle Operating States

Vehicles may have multiple operating states, which in some embodiments may be associated with certain vehicle profiles, which are described herein. For example, a vehicle that has a destination of a specific Boarding Zone, may undertake a sequence of profiles representing a set of vehicle states (vstates).

vstate01: vehicle is traveling at a range of high speeds on the main track, using one or more control systems, primarily the Vehicle Management Systems (e.g., VMS 110), to position the vehicle in continuous flow of vehicles. For example, a VMS 110 may use feedback control to maintain the appropriate distance to the next vehicle ahead. This may be the Vehicle Cruise Profile ("VCP"), whereby although the vehicle may vary speed, the VMS 110 is maintaining velocity within specified parameters of VCP. In this example Vtarget=50 kph, though this may have a variance, Vtarget_V=20 kph, where the target velocity may vary by plus or minus 20% (40 kph to 60 kph) to accommodate vehicles maneuvers.

vstate02: vehicle is traveling with fixed acceleration on the main track, reducing its speed so that it enters a loading zone within a very tight tolerance of a target velocity Vtarget (e.g., Vtarget=25 kph). In some embodiments, this may be a Vehicle Traverse Profile (VTP) with parameters such as Vtarget=25 kph.

vstate03: vehicle is changing lanes at speed Vtarget, for example undertaking Vehicle Merge/Demerge Profile ("VMP").

vstate04: vehicle moves forward at speed Vtarget, until it encounters another vehicle, arrives at the end of the input buffer and/or is instructed to vary speed, for example by a BMS. Such operations may, in some embodiments, form part of Vehicle Buffer Profile ("VBP").

vstate05: vehicle moves forward at speed Vtarget until it either encounters another vehicle, enters the allocated parking spot or is otherwise instructed by BMS. These operations may form part of a Vehicle embarkation/disembarkation profile ("VEP").

vstate06: vehicle is at rest unloading passengers. In some embodiments, this is the Vehicle Embark/Disembark profile ("VEP").

vstate07: vehicle is at rest loading passengers (e.g., the vehicle is operating VEP).

vstate08: vehicle is at rest waiting to depart (e.g., the vehicle is operating VEP).

vstate09: vehicle is backing up, out of its parking spot (e.g., the vehicle is completing VEP operations).

vstate10: vehicle is moving forward until it encounters another vehicle, arrives at the end of the output buffer and/or is instructed to vary speed, for example by a BMS 106 (e.g., the vehicle is operating VBP).

vstate11: vehicle has identified and/or been informed of a virtual vehicle (i.e., open spot) in a continuous main flow, and is accelerating to Vtarget in order to match the speed and position of this spot, operating VMP.

vstate12: vehicle is changing lanes at speed Vtarget, into its open spot in main flow, operating VTP.

A virtual vehicle may be used to identify and manage gaps between actual vehicles in our system. For instance, a virtual vehicle may be inserted between two real vehicles, which may then adjust their velocities so as to accommodate its presence. A real vehicle executing a merge maneuver may establish a virtual vehicle at its target position in its new lane. A real vehicle exiting a loading zone does so into the gap maintained by a virtual vehicle (see vstate11 above).

Vehicle Slot States

In addition to buffers, coordinated embarkation may be facilitated by a set of boarding zone parking slot states (zstates) described below.

zstate01: vehicles are free to move from the input buffer to their assigned parking spots.

zstate02: vehicles can be held within the input buffer, but outset vehicles (e.g., vehicles that will be departing) are not yet cleared to depart.

zstate03: vehicles can be held within the input buffer, and outset vehicles are free to depart.

zstate04: vehicles can be halted at the end of the input buffer for a fixed time (allowing outset vehicles, which have initiated departures to move clear of new vehicles entering the parking zone area).

Maneuver Communication

Vehicle maneuvers described herein may involve various communications with several different management systems and controllers on the system. For instance, a vehicle may have situational awareness of the location of the vehicle in relation to the roadway and to vehicles in the vicinity as determined by that vehicles sensors and/or information supplied by one or more management systems, including BMS 106, such information including the distance to the vehicle ahead on the roadway.

A logical vehicle may be inserted into a continuous flow, such as a phantom vehicle, so that a physical vehicle may seamlessly merge with the continuous flow. A phantom vehicle may be considered by the vehicles adjacent to that phantom as a physical vehicle. The physical vehicle may replace the space occupied by the phantom vehicle when the merge is complete. The relevant TMS 108 for the segment of track into which such a phantom is inserted may coordinate merging operations with the vehicle management system associated with the merging physical vehicle. In some embodiments, a BMS 106 may initiate the phantom vehicle where such initiation may be in response to and/or in collaboration with BRMS. For example, a BRMS may provide an RJIS to the BMS 106, which then assigns a specific physical vehicle to the passenger identified in the RJIS. At this time or any time thereafter the BMS 106 may initiate and deploy a phantom vehicle into the continuous flow, and provide the relevant TMS 108 with such information. Coordination of the merging of the phantom vehicle with the physical vehicle may involve physical vehicle VMS 110, relevant TMS 108, initiating BMS 106 and/or BRMS in any combination, with appropriate confirmations, acknowledgements and other information set communications occurring as determined by each manager.

A BMS 106 may be informed of empty vehicles approaching, by for example relevant TMS 108 and/or BRMS. Additionally, a BMS 106 may control the transfer of vehicles into and out of different sets during parking or standing (e.g., the set of vehicles that will depart as a group with the next departure cycle). Further, the BMS 106 may inform and vehicles may determine the availability of parking spots or vehicle slots (e.g., vehicle slots 405, 505) in a loading zone (whether each spot is taken or free), though in some embodiments, slot allocation is undertaken by the BMS 106.

Dynamic Buffers

Figure 6:
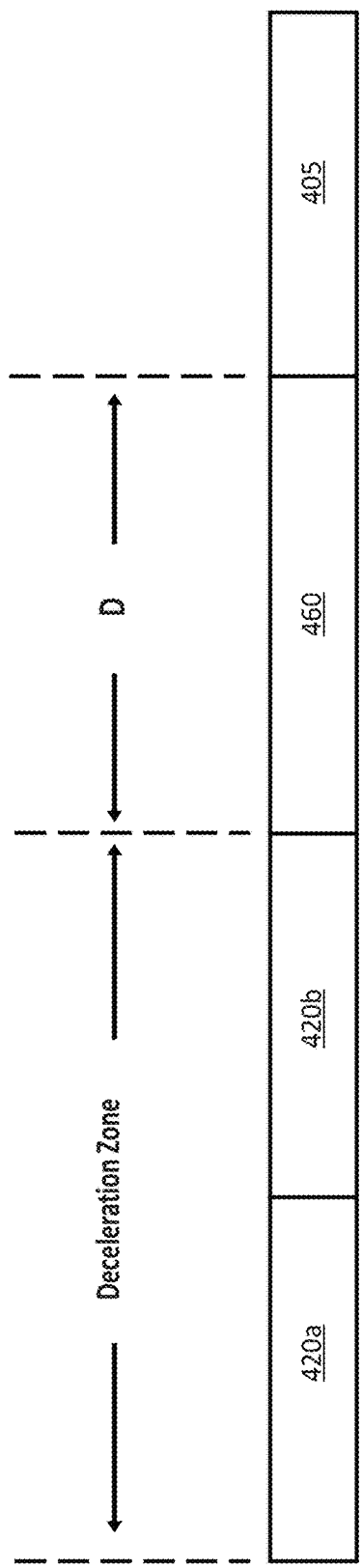
FIG. 6 illustrates a combination of deceleration zones coupled with an example buffer adjacent to a set of boarding slots.

In some embodiments, a buffer may be dynamic in that the physical dimensions of the buffer and/or the transit velocity of the vehicles in the buffer may be varied based on the current and/or anticipated passenger and/or vehicle load of a boarding zone. For example if a deceleration zone is directly adjacent to a set of boarding slots, then the buffer size is effectively zero. Alternatively, there may be a buffer of distance (D), as illustrated in FIG. 6, which in this example is 18 meters. Such a buffer may be capable of supporting a number (e.g., quantity) of vehicles travelling at, for example, a maximum of 10 kph. This equates to a time buffer of approximately 3.5 seconds for a vehicle to traverse such a buffer. This time period enables a BMS 106 to, if not already done, allocate an appropriate boarding slot for the incoming vehicle and associate a specific passenger with that vehicle. In this example, a vehicle that is assigned the closest slot in a multi slot arrangement will have approximately 0.5 seconds to enter the slot, providing a 4 second buffer which equates to the average time of a passenger traversing the vehicle zone. In an optimized system, the vehicle and passenger will synchronize such that there is minimum friction for the passenger experience. In some embodiments such passenger experience friction may have one or associated metrics such as "glide", where the higher the friction the lower the glide metric. In another example if the vehicle is assigned the furthest slot, then the transit time may be approximately 10 seconds and as such a passenger who is travelling more slowly or is further from the vehicle zone may be assigned to the vehicle associated with that slot. In this manner, a BMS 106 may operate to optimize the passenger experience with minimum friction.

FIG. 6 illustrates a combination of deceleration zones (420a and 420b) coupled with an example buffer 460 adjacent to a set of boarding slots or vehicle slots 405. In an example, a vehicle may decelerate from 35 kph to 25 kph in deceleration zone 420a. Deceleration zone 420a may have a length of 16.4 meters and may have the capacity for three ("3") vehicles. Deceleration zone 420b may have a length of 16.2 meters and may have a capacity for three ("3") vehicles. Vehicles may decelerate from 25 kph to 10 kph in deceleration zone 420b.

Within buffer zone 460, vehicles may be restricted to a maximum speed of 10 kph. The buffer zone 460 may be 18 meters long and may have a capacity for five ("5") vehicles. The vehicle slots 405 may occupy 30 meters (e.g., 30 m for 10 slots) and may allow for variable vehicle speed of up to 10 kph for entry and exit and other slot area maneuvers. The vehicle capacities associated with each of the deceleration zones 420a, 420b and buffer 460 are approximated and assume some appropriate distance between each vehicle.

A boarding zone may include a boarding zone ingress buffer (as illustrated in FIG. 4B) for vehicles that are arriving at a boarding zone to disembark and/or embark a passenger at a specified time period from a boarding slot. At a distance from a boarding zone slot (e.g., vehicle slot 405), a vehicle may establish communications with a boarding zone controller 206. In some embodiments, such communications may be established before vehicle enters a deceleration zone 420, for example, when vehicle is transiting the roadway assigned to a specific TMS 108 that is adjacent to such deceleration zone 420. Once the vehicle enters the boarding zone ingress buffer 406, a BMS 106 may calculate the relative timings for such a vehicle to traverse that buffer 406 on its way to boarding slot area (for example T(IB) for the buffer and T(S_a) for the boarding slot which in combination equate to T(BI)). In region 442, the vehicle enters the boarding zone ingress buffer 406 and adopts the speed of the buffer creating a buffer time T(IB). In region 444, the vehicle is assigned a specific boarding slot (e.g., vehicle slot 405) at time T(S_a). Each of these timings may be used by BMS 106 to coordinate the embarkation of a passenger to an assigned vehicle and/or coordinate the progress of that vehicle to the destination boarding zone. The total time to travel across region 446 or the time for the vehicle to traverse the boarding zone ingress funnel (e.g., T(BI)=T(IB) 30 T(S_a).

Additionally, a boarding zone may include a boarding zone egress buffer 407 for vehicles that are departing a boarding zone at a specified time period from a boarding slot or a vehicle slot 405. For example, in FIG. 4B, this time buffer may comprise T(BE) associated with region 448, where this in turn consists of T(P_n) associated with region 450, representing the time of the calculated vehicle departure, including the time taken to traverse the boarding zone slots and any time calculated by a BMS to align such a vehicle with a phantom vehicle that has been created in the continuous flow for that vehicle. Specifically, T(BE) is the time for the vehicle to be matched to a specific position in the continuous flow (e.g., T(P_n)) and the time for the vehicle leaving the boarding zone egress buffer by adopting the speed of the buffer creating buffer time T(EB) associated with region 452.

The time for a passenger disembarkation/embarkation of a vehicle at rest is the dwell time or T(R). Additionally, the time for the vehicle to traverse the vehicle boarding zone slots to the assigned slot is T(S_n). Thus, the total time associated with region 454 is the sum of T(R) and T(S_n) is T(VS), for example T(VS)=T(R)+T(S_n).

The BMS 106 may create "logical phantom vehicle(s)" that correspond to empty spaces that are inserted into a continuous vehicle flow to create and reserve a position for a physical vehicle so as to leave a boarding zone egress zone and enter a continuous vehicle flow.

In some embodiments, spaces corresponding to the phantom vehicles for anticipated physical vehicles may be interspersed into a continuous flow prior in time to specific physical vehicles such that each physical vehicle that departs the egress buffer has a logical phantom vehicle with which it will coalesce. The integration of space corresponding to such a phantom vehicle into a representation of the continuous flow, may in some embodiments be coordinated by those managers that are identified in the RJIS. The RJIS may include route information for the journey to be undertaken. For example, a TMS 108 may coordinate with a BMS 106 such that the BMS 106 requests that the TMS 108 create and insert a phantom vehicle into an available space in a representation of the continuous flow. For example, if a set of vehicles has a spacing of, for example 4.5 m between each vehicle, the insertion of the phantom vehicle may be undertaken by a TMS 108 where each of the vehicles adjacent to the inserted phantom vehicle is informed of such an insertion. This may be communicated to each of such vehicles in advance of the insertion, which vehicles VMS 110 may adjust one or more parameters of the operations of vehicle to accommodate such insertion.

Figure 7A:
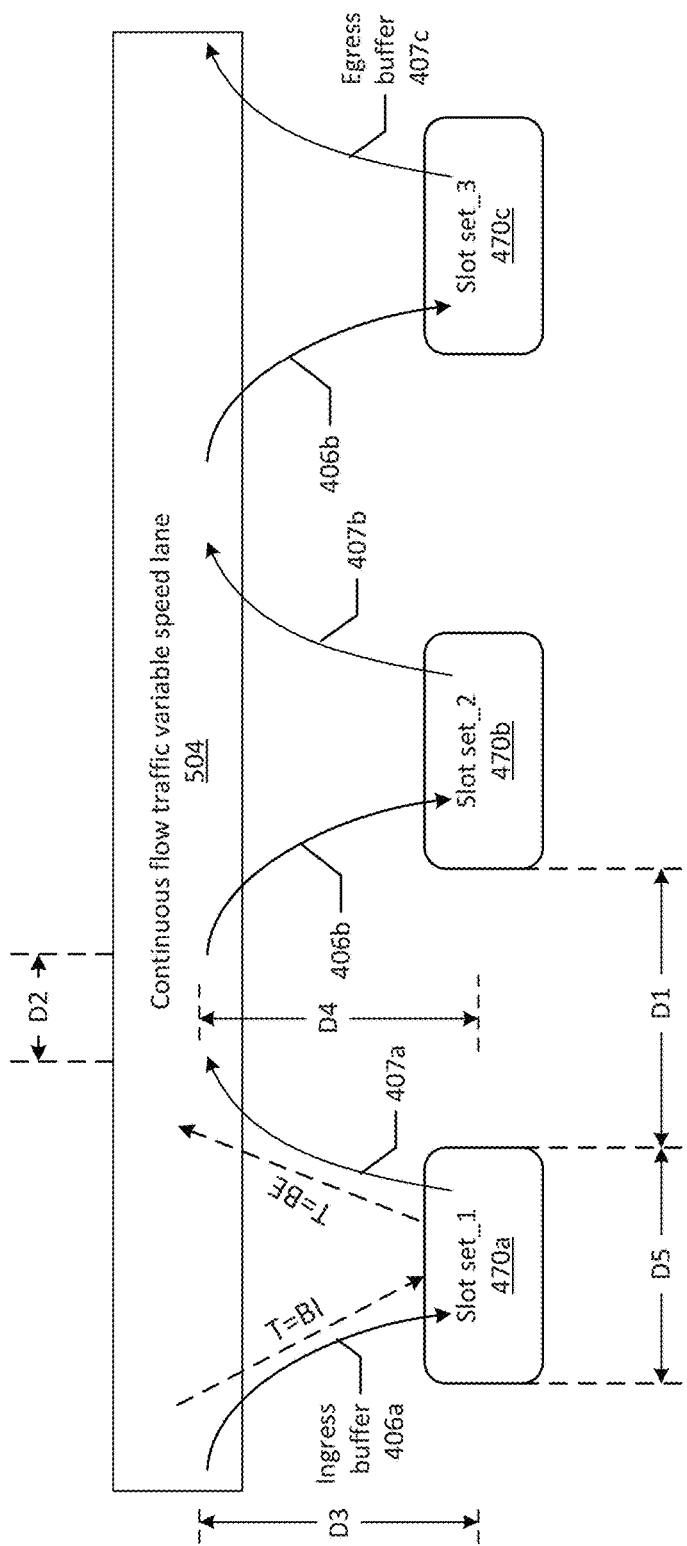
FIG. 7A illustrates an example embarkation or disembarkation area with multiple vehicle slots sets, according to an example embodiment of the present disclosure.

As illustrated in FIG. 7A, multiple sets (e.g., slot sets 470a-c) of vehicle slots may be managed. For example, slot set_1, slot set_2, and slot set_3 may each have their own respective ingress buffers 406 and egress buffers 407. Slot set 470a or slot set_1 may include "N" slots, slot set 470b or slot set_2 may include "P" slots, and slot set 470c or slot_set_3 may include "Q" slots. The quantity of slots in each slot set may be the same (e.g., P=N=Q) or different. The distance, D1, may represent the distance between boarding slot sets (e.g., groups of vehicle slots), for example the distance between slot set 470a and 470b. Additionally, D2 may represent the distance between an egress buffer exit from a previous boarding zone slot set to the ingress buffer entrance for the next boarding zone slot set (e.g., distance between egress buffer 407a and ingress buffer 406b). Because the distance between each boarding slot set may include an egress buffer and an ingress buffer, the distance D1 is larger than D2. D3 and D4 may represent the length of an ingress boarding zone slot set buffer (e.g., ingress buffer 406a) and the length of an egress boarding zone slot set buffer (e.g., egress buffer 407a) respectively. The length of a boarding zone slot (e.g., slot set 470a) set may have a distance D5.

Figure 7B:
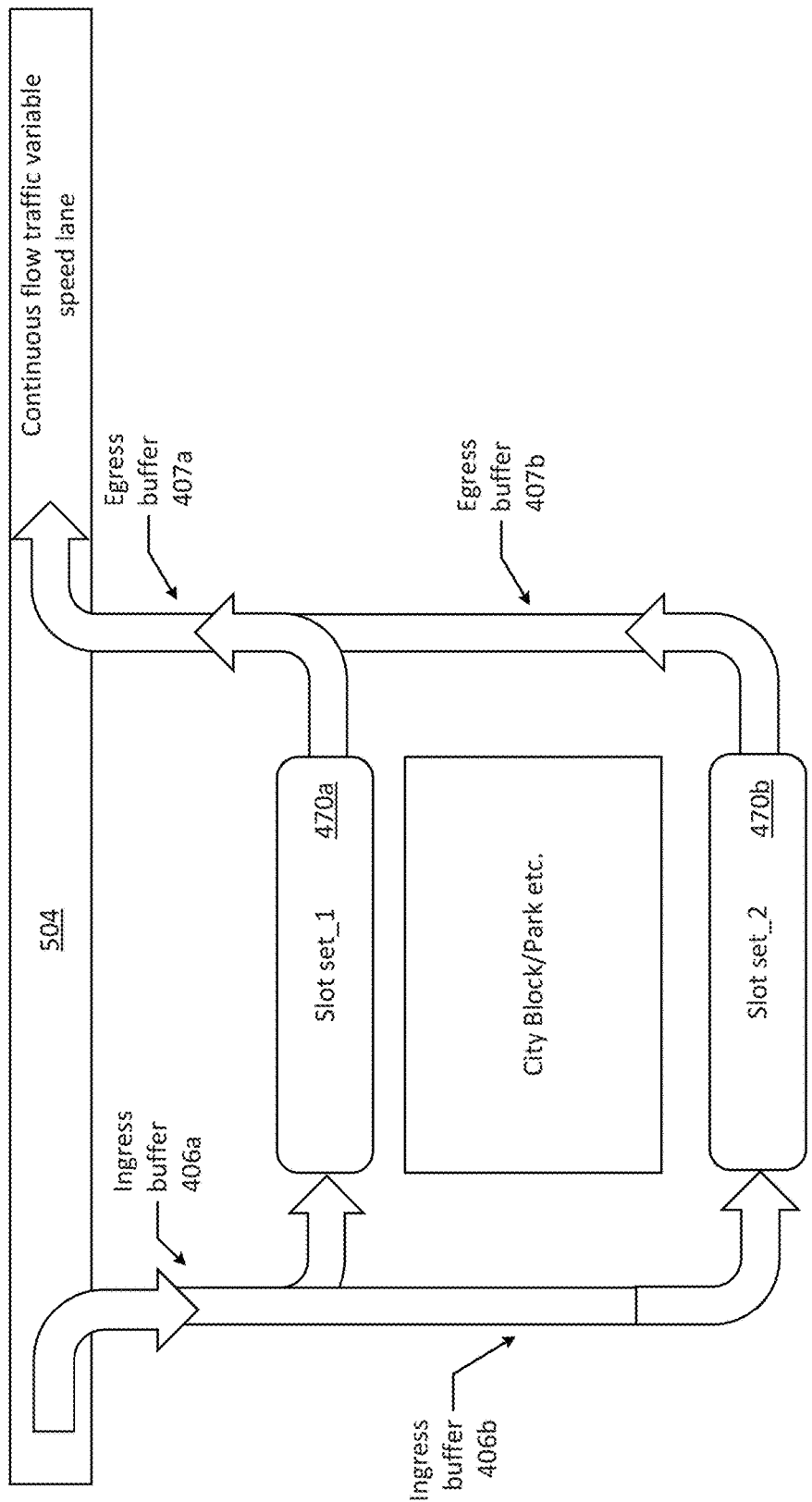
FIG. 7B illustrates an example embarkation or disembarkation area with multiple parallel boarding slots, according to an example embodiment of the present disclosure.

As illustrated in FIG. 7B, a boarding zone may comprise a set of parallel boarding or vehicle slots, for example arranged around a city block, park or other area. In this example, vehicles with inbound passengers that are disembarking at this boarding zone, where these passengers and/or the passengers who are embarking are known to require more time than the average, may be directed to slot set_1. For example, passengers associated with boarding/de-boarding times that exceed the average may embark or disembark from vehicle slot set_1. Conversely, passengers that disembark/embark at the average or less than average disembarkation/embarkation time may be directed to slot set$_{13}$ 2. In the example illustrated in FIG. 7B, slot set_1 and slot set_2 may share common ingress buggers 406 and egress buffers 407 that integrate with a continuous flow variable speed lane 504, which may in some embodiments incorporate at least one deceleration and acceleration zones. As illustrated in FIG. 7B, ingress buffers 406a and 406b may form a common buffer 406 for slot sets 470a, 470b. Similarly, egress buffers 407a and 407b may form a common buffer 407 for slots sets 470a, 470b.

Passenger Considerations

In some embodiments, a passenger who has made a reservation through interaction with a BRMS system resulting in an RJIS, representing the information set of the reservation, arrives at a boarding zone to undertake their embarkation at the time period specified in the RJIS and confirmed to the passenger through the booking system.

For example, the RJIS may include the information set for the reservation of a vehicle, in which to undertake any processing required to assign a specific slot and/or vehicle to a person and/or to undertake any operations required for that vehicle, when the passenger is aboard to join a stream of other vehicles.

For example, based on the zones outlined herein and assuming the notional walking speed of 1.5 meters per second, lead times for the outer geo zone may be 30 seconds. Additionally the lead times for the inner geo zone and the vehicle geo zone may be approximately 12 seconds and 4 seconds respectively.

As a passenger moves through these zones towards the vehicle one or more operations may be triggered by them. Passengers may be assigned physical boarding slots, where a vehicle may arrive, based on the direction from which they are travelling, their rate of travel and/or any physical limitations to their situation, for example heavy shopping, one or more children accompanying them, having a physical disability and/or their preferences and the like. In some embodiments, such information may be displayed on an application operating on a passengers device and/or may be presented by one or more displays at the boarding zone, including on the vehicles themselves and/or at the kiosks if present. Information may be conveyed to a passenger as they move towards the boarding slot for their vehicle.

In some embodiments, Passengers may be assigned a specific vehicle when they enter a vehicle zone, which vehicle may in part be determined by the availability of a vehicle and the optimum entry time of a passenger to a vehicle.

Passengers may be pre-positioned in the geo fenced boarding zones. For example, there may be multiple staging areas, which may include an initial zone or outer geo zone, a medium zone or inner geo zone, and a vehicle zone. The initial zone may be 30 meters to 50 meters from a vehicle slot, for example, approximately 45 meters. Additionally, the medium zone may be 10 meters to 20 meters from the vehicle slot, for example, 18 meters. The vehicle zone may be 4 meters to 6 meters from the vehicle slot. As discussed herein, passengers are estimated to walk with an average speed of 1.5 meters per second. Depending on passenger characteristics, passengers may travel anywhere from 0.5 to 2 meters per second.

Using the average speed above, initial passenger recognition at 45 meters equates to 30 seconds. Additionally, an average passenger boarding time or "dwell time" may be approximately 40 seconds. Additionally, and estimated acceptable time for a passenger to wait from door close (e.g., enter vehicle and close vehicle door) and the passenger informs or acknowledges their readiness to depart such that the vehicle starts rolling is approximately 15 to 30 seconds. Thus, in an example embodiment, approximately 85 seconds may pass from passenger recognition to wheel start, which may represent the maximum boarding zone time buffer. The maximum boarding zone time buffer may be used to provide the central control system the maximum time buffer for matching a passenger to a vehicle.

Passengers may have variable tolerances to different waiting times. For example, if there is no waiting time, then the passenger experience is optimal and this is considered a glide scenario. For example, the passenger glides through the process in a continuous fashion without any unnecessary wait times. A delay or wait time of 1 minute may result in minimal friction, while a wait time of 2 minutes may result in tolerable friction. Wait times of approximately 3 minutes may result in higher friction until the passenger experiences unacceptable friction for wait times of approximately 5 minutes or more.

In some embodiments, passengers may leave a vehicle when the vehicle is stationary at the assigned boarding slot and they are advised and as such may pass through the geo fenced zones of that boarding zone. In the interests of efficiency and safety of passengers egressing the vehicle may be encouraged to exit the vehicle zone at the earliest possible time. Existing at the earliest practical time may benefit the operations such that when a vehicle is exited, the dwell time for that vehicle may be minimized.

An application, potentially on their device or presented on a display within the vehicle when arriving, may direct them to the most efficient route to their final destination. Once a vehicle is empty, the doors from which the passenger has exited my close and an air clearing operation may be undertaken. Then, the vehicle may be ready for the next passenger.

The vehicle may be provided with the identity of the passenger and the appropriate method for recognition of that passenger, for example face recognition, secure token recognition (physical and/or logical), fingerprint, 2D or 3D barcode, physical ticket and/or the like. For example, a Bluetooth communication may be undertaken between the passenger and the vehicle whereby one or more secrets, including cryptographic keys may be exchanged so as to validate the identity of the passenger, and in some embodiments, validate that customers good standing within the overall system. For example, checking their ability to pay for the service, verify the specifics of the value exchange for that voyage, including any coupons and/or special offers, verify that they have no adverse system behaviors that would preclude their using the service (for example vandalism of the service vehicles) and the like.

Figure 8:
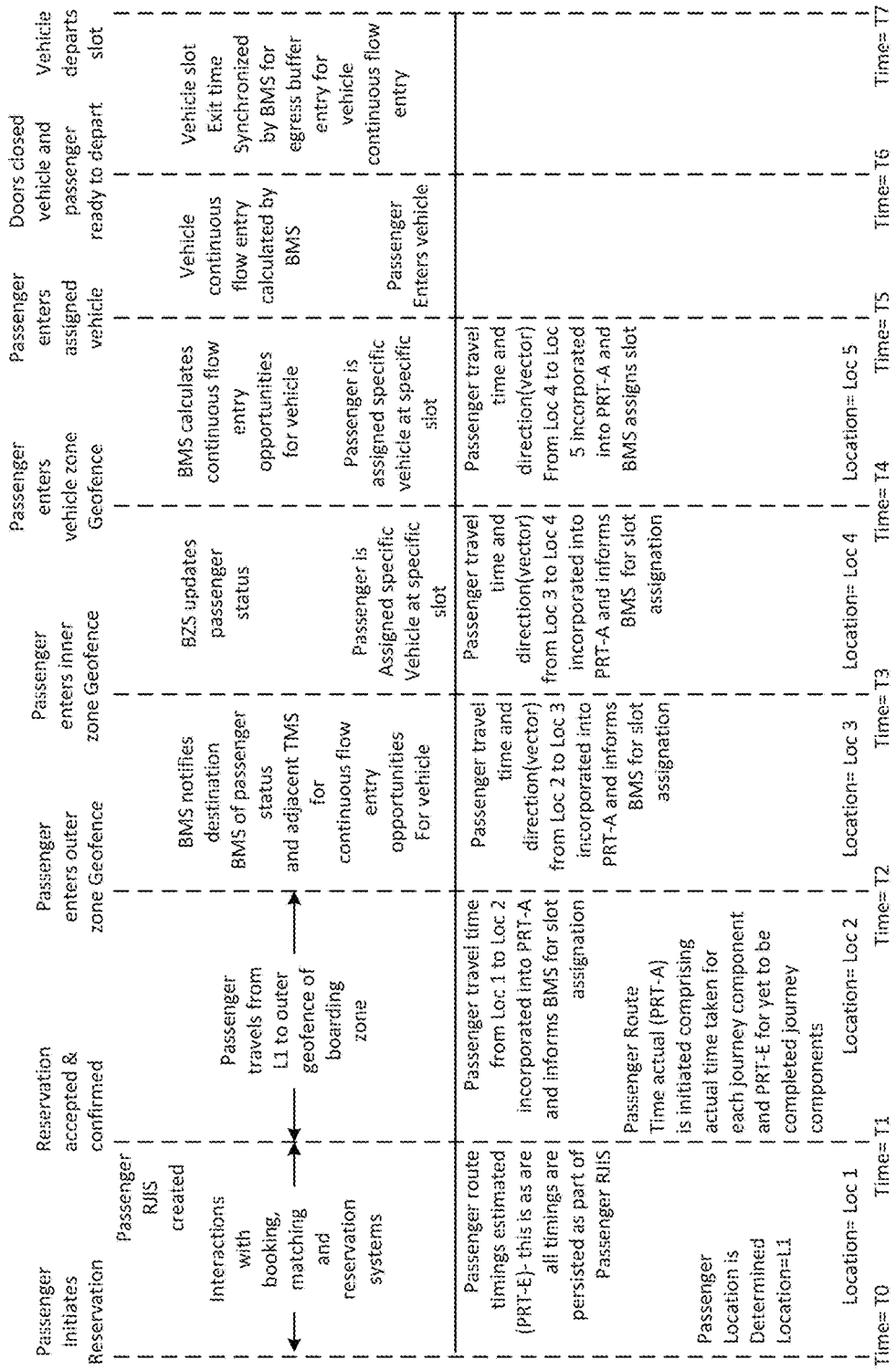
FIG. 8 illustrates a representation of an example timeline for passenger vehicle interactions.

FIG. 8 illustrates an example time line for a passenger interaction and resulting vehicle assignment leading to a passenger embarking from a boarding zone slot. In this example, there may be a set of events, T0 to T7, where the system is configured so as to accept and initiate a passenger journey.

Figure 9:
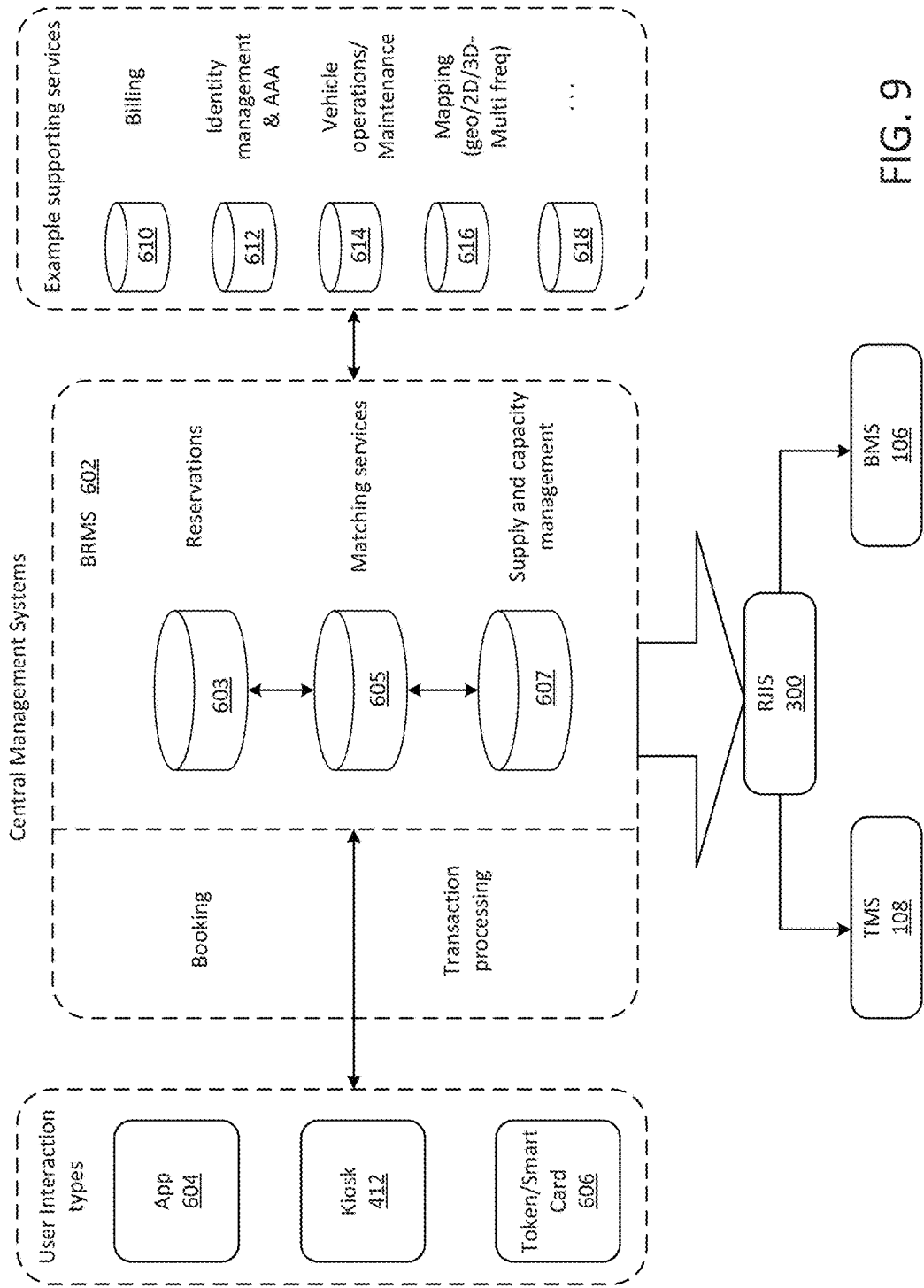
FIG. 9 illustrates an example central management system and components thereof, according to an example embodiment of the present disclosure.

A BRMS 602 (as illustrated in FIG. 9) accepts a passenger initiated journey request at T0 (e.g., passenger initiates a reservation). The passenger location may be determined to be at L1 (for example their home, office, restaurant, etc.). The request is confirmed and scheduled at T1 by the BRMS 602. The confirmation may include BRMS 602 incorporating information associated with passenger, including their preferences and calculations for the timing associated with that passengers location and the location of the boarding zone at which they will embark.

At a subsequent time, T2, the passenger is detected as having entered the outer geo zone of the boarding zone. They may, in some embodiments with their agreement, have had their journey to the boarding zone monitored to establish, for example, their rate of travel so as to optimize their experience, synchronize with other passengers they may be associated with and/or the like. As they have now entered a zone controlled by a BMS 106, they have initiated their actual journey, and as such the RJIS 300 associated with their reservation is updated to include the actual timing relative to the estimated timing. These may be stored in both relative and absolute times and may be provided by one or more system clocks. When a passenger is identified at the outer geo fence, a BMS 106 may communicate with a TMS 108 an RJIS 300 for that passenger such that the TMS 108 may loosely couple that RJIS 300 to a set of vehicles suitable for that passenger, for example those vehicles disembarking passengers at that boarding zone and/or other available vehicles.

When the passenger enters the inner geo fence, BMS 106 updates the status of the passenger time information, including calculation of the rate of travel within the boarding zone, and ascertains the vector of travel of passenger towards the boarding slots. Information sets managed by BMS 106, including RJIS 300 are updated with this information. During this traversal at least one vehicle is identified as suitable for allocation to that passenger. BMS 106 may also communicate with TMS 108 to create a phantom vehicle in the continuous flow for passenger and their associated vehicle when assigned.

As the passenger enters the vehicle zone, the vehicle and boarding slot are assigned and communicated to the passenger. The timing of a disembarking passenger, if appropriate and the embarking passenger are monitored. Such monitoring may include optical barriers, facial or other biometric recognition, passenger device monitoring, gait or other travel calculations and the like. BMS 106 may then communicate to one more TMS 108 the anticipated timing for phantom vehicle and actual vehicle to intersect in the constant flow and adjust timing to include vehicle egress buffer timings, and slot departure timings as appropriate. At T6 passenger enters the vehicle and vehicle recognizes this event, which may initiate a further BMS 106 operations to synchronize vehicle departure with phantom vehicle in continuous flow. In this example vehicle departs slot at T7.

Using Time Domain Information for Traffic Flow Operations

Time domain information may be used by one or more control systems. For example, time domain information uses may include: a) provision of slot allocations for one or more vehicles when merging with an existing flow of vehicles; b) creation of shoals of vehicles (logical or physical) through integration of such vehicles into proximity of other vehicles; c) assignment of boarding slots based on shoals and associated attributes of passengers sharing such attributes (e.g., offering passengers the opportunity to share a vehicle to the same destination); and d) optimization of overall system flow through incorporation of such time domain information coupled with the information sets provided at the reservation and current and/or predicted demand for capacity within the system.

FIG. 9 illustrates a central management system and components thereof. In this embodiment, there are examples of user interaction types, including applications 604 (e.g., smart phone/device, web and applications), kiosks 412 and other self service systems and tokens/smart cards 606 that may be pre-paid/value cards and which may include one or more forms of digital currencies, including currency equivalents.

A CMS 102 may include a BRMS 602 as described herein and a set of supporting services, such as for example billing systems 610, identity management 612, vehicle maintenance 614 and operations and mapping systems 618. The CMS may include other supporting services 618. The BRMS 602 may include systems for handling reservations 603, matching services 605 as well as supply and capacity management 607. Identity management 612 may include authorization, access and authentication capabilities, which ensure that the identity of a passenger is sufficiently rigorously established and validated. This information may have associated passenger billing and preference information sets, which may at least in part, inform CMS 102, BRMS 602, TMS(s) 108 and BMS(s) 106 thereby allowing these systems to effectively and efficiently manage passenger journeys, including where practicable optimizing the passenger experience whilst maintain overall system operational integrity, capacity and performance. Vehicle operations and maintenance 614 may monitor vehicle characteristics, including for example battery capacity, tire and other consumable materials state, vehicle cleanliness and other vehicle conditions and in conjunction with other system managers determine the appropriate maintenance schedules for these vehicles. Such information sets may be integrated with supply and capacity management, including for example the pre-positioning of vehicles in anticipation of known or anticipated demand, such as for example at peak hours, sport events and the like.

The management systems disclosed herein may employ a number of mapping technologies (e.g., via mapping systems 616) to establish with a high degree of accuracy the track on which vehicles will operate. This may include, radar (including at multiple and/or swept frequencies, optical, RF (including infrared/ultrasonic), position system derived (including SNSS, RF ID and other location technologies) and the like.

The BRMS 602 system generates an RJIS 300, which details the route-journey information set, comprising the respective origin and destination boarding zones (and their respective BMS 106), and the TMS 108 representing the route that the vehicle will take between the origin and destination. Such RJIS 300 may be communicated to the relevant system managers as shown in FIG. 9 and FIGS. 10A and 10B.

Figure 10A:
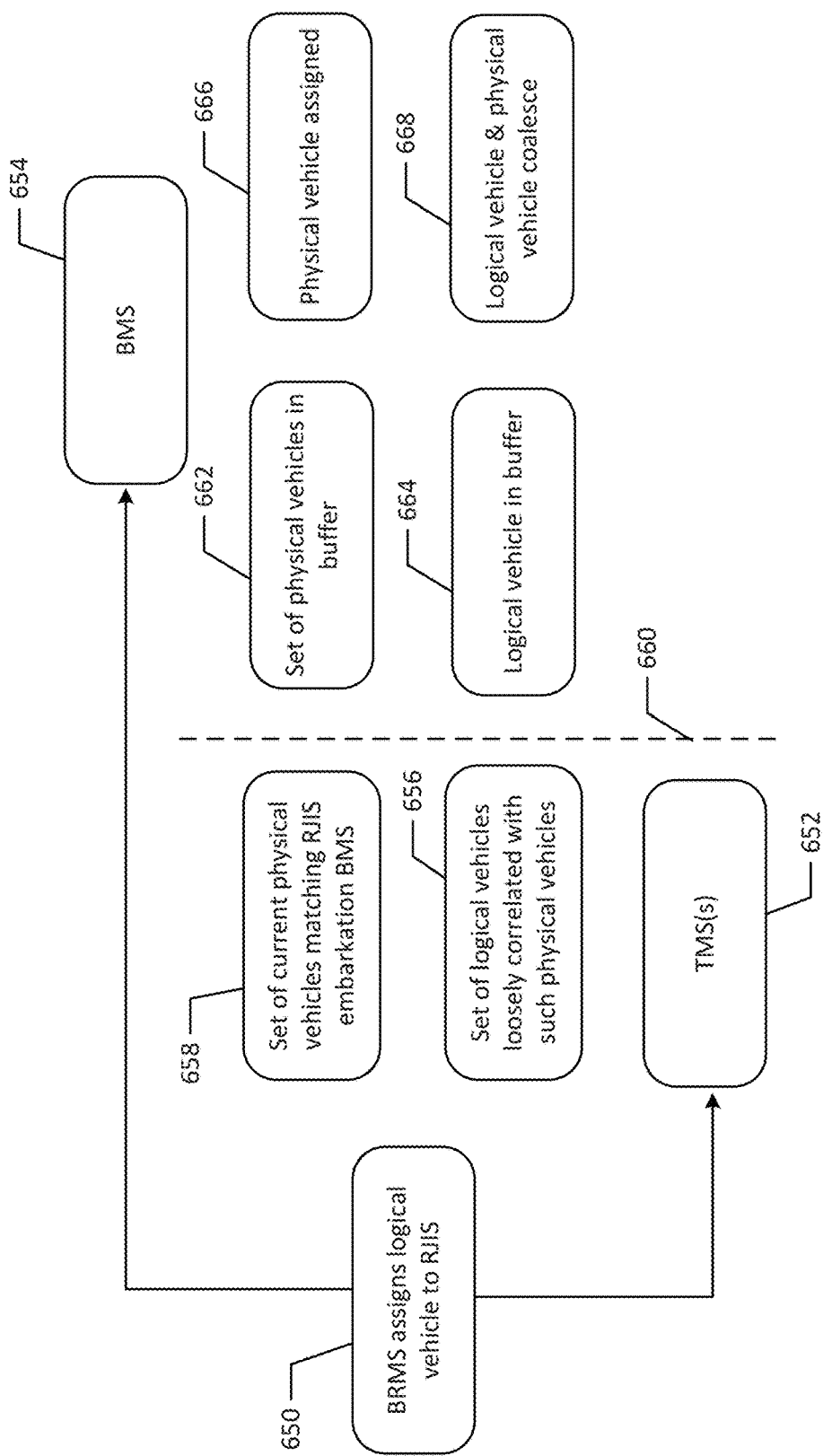
FIG. 10A illustrates a block diagram of an example vehicle assignment timeline and lifecycle.

FIG. 10A illustrates a vehicle assignment timeline and lifecycle. At block 650, the BRMS 602 assigns a logical vehicle to the RJIS 300. The RJIS 300 is communicated to one or more TMS 108 (block 652). For example, the RJIS 300 may be communicated to TMS(s) 108 prior to being communicated to a BMS 106 or boarding zone controller. The RJIS may also be communicated to a BMS 106 where a passenger is specified who has reserved an embarkation at time (T) (block 654). While the vehicle is traveling through various track segments under control of the TMS(s) 108 prior to being handed off to a BMS 106, vehicles may be loosely correlated to physical vehicles (block 656) and physical vehicles may be correlated to an RJIS and/or BMS (block 658).

The vehicle may be handed to a BMS, indicated by the TMS/BMS boundary 660. After the boundary 660, the BMS 106 may manage and/or assign the set of physical vehicles in a buffer (block 662), logical vehicle in buffers (block 664), physical vehicle assignment (block 666), and coalescing of logical and physical vehicles (block 668).

Figure 10B:
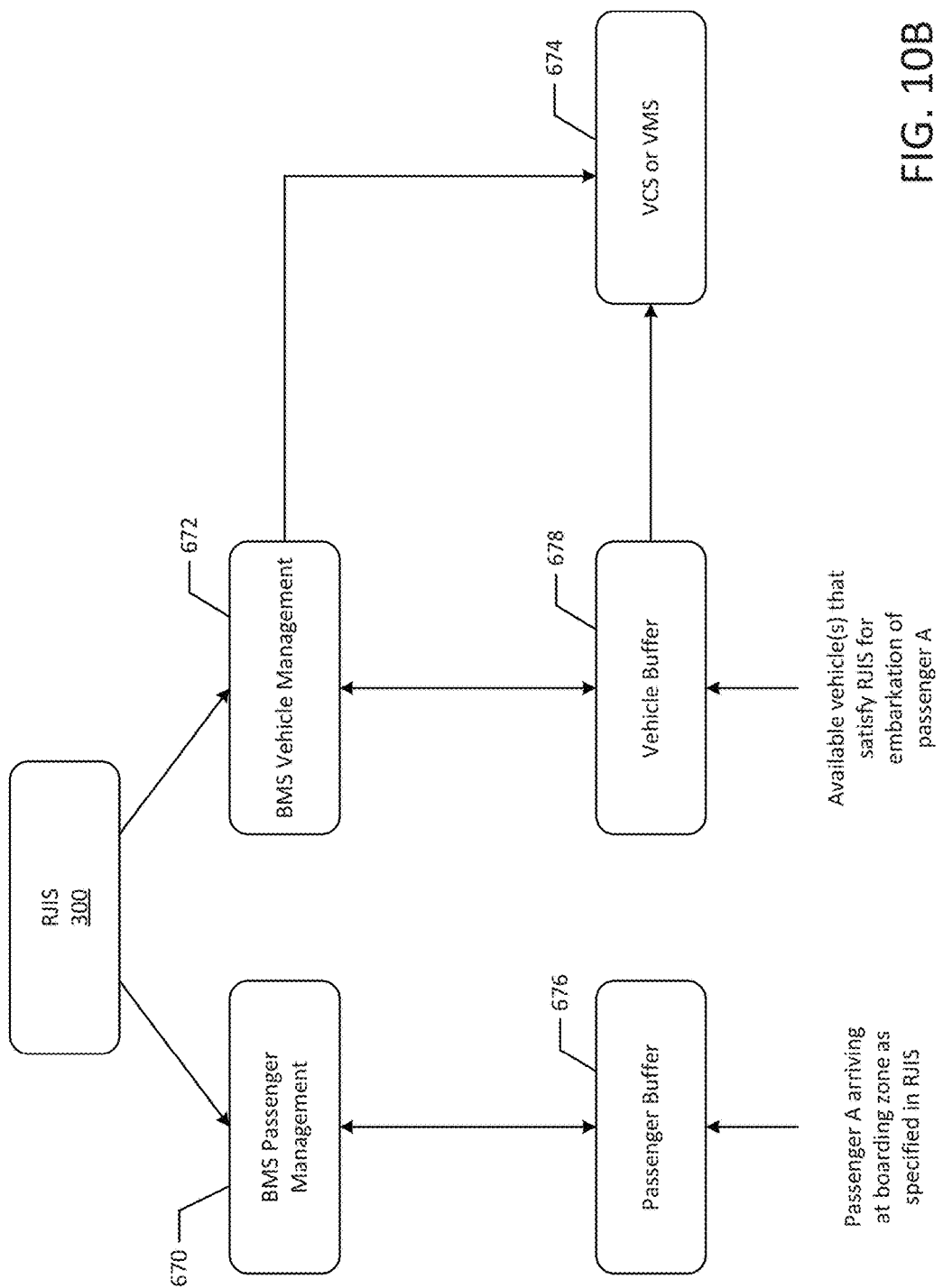
FIG. 10B illustrates a block diagram of an example route-journey information set assignment timeline and lifecycle.

FIG. 10B illustrates a block diagram of an example route-journey information set assignment timeline and lifecycle. The RJIS 300 may be used for both passenger management (block 670) and vehicle management (block 672). Additionally, the RJIS 300 may be sent to a set of candidate vehicles and their associated vehicle control systems or VMS 108 (block 674). In an example, at vehicle assignment, an RJIS 300 may be assigned to a specific vehicle VCS or VMS 108. Passenger management and Vehicle management may also depend on passenger buffers (block 676) and vehicle buffers (block 678).

Figure 11:
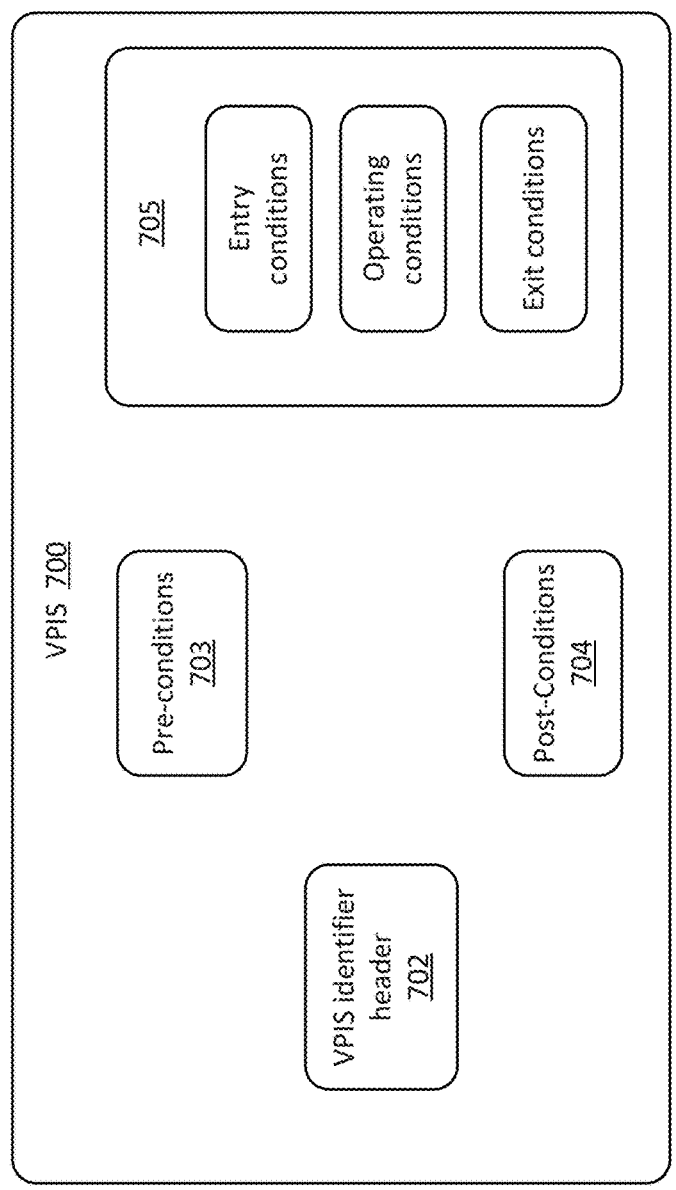
FIG. 11 illustrates a block diagram of an example vehicle profile information set, according to an example embodiment of the present disclosure.
Figure 12:
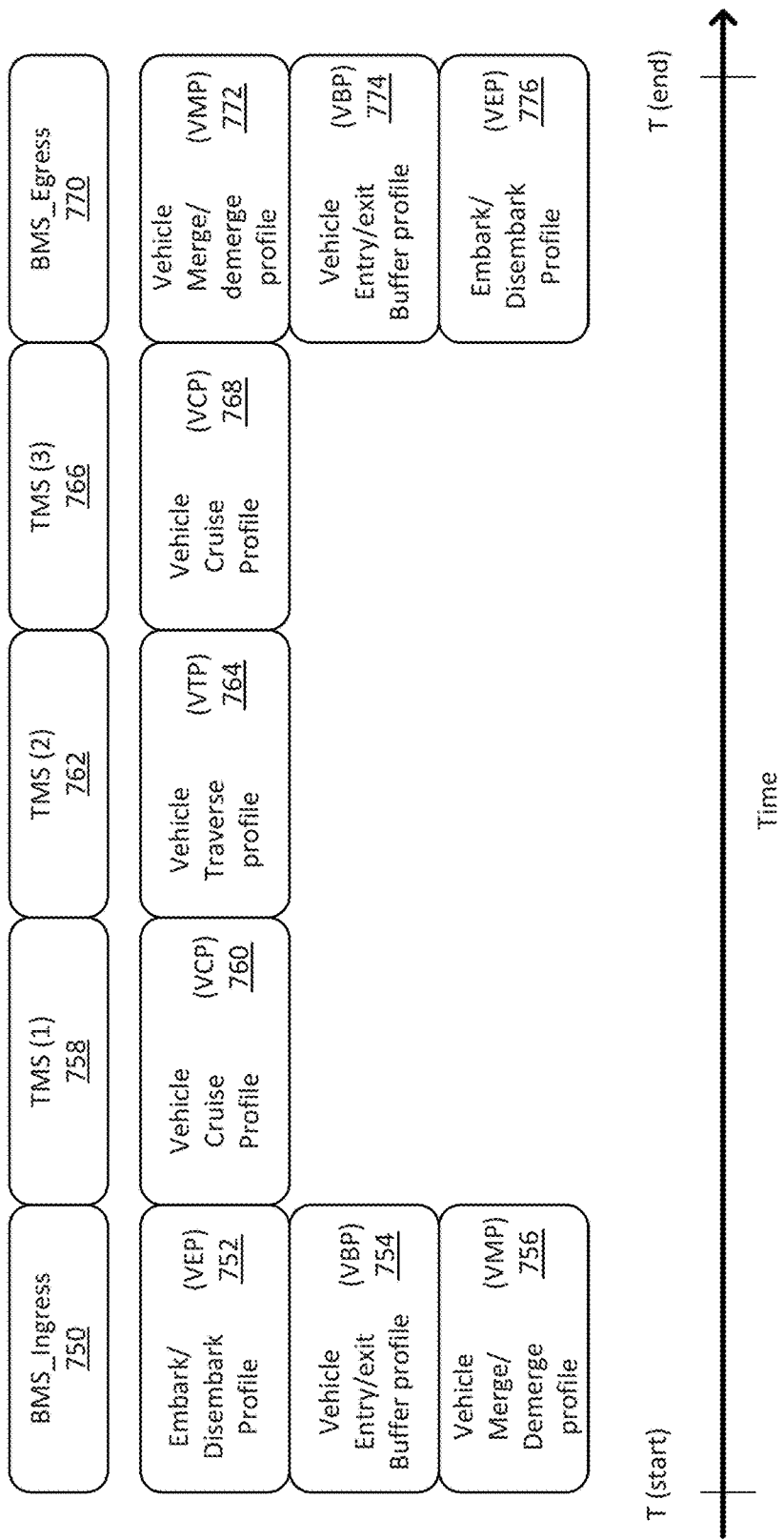
FIG. 12 illustrates a block diagram of an example passenger route plan with associated vehicle profiles.

The RJIS 300 may include the vehicle operating profiles that the vehicle will execute in pursuit of undertaking the intended journey. Each of these profiles comprises a Vehicle Profile Information Set ("VPIS"), an example of which is illustrated in FIG. 11. The VPIS 700 may include a VPIS identifier header 702, pre-conditions 703 and post conditions 704. The identifier header 702 may include information that associates the VPIS 700 to a specific vehicle, RJIS 300, vehicle slot, etc. The VPIS 700 may also include other condition information 705 such as entry conditions, operating conditions, and exit conditions FIG. 12 illustrates a route plan from an RJIS 300, detailing the relevant managers (BMS and TMS) and the associated profiles that are to executed under the domain of such managers. As illustrated in FIG. 12, the route plan may include vehicle profiles for ingress into a boarding zone, such as traveling through an ingress buffer (block 750). The vehicle profiles during BMS_Ingress may include an embark/disembark profile (block 752), a vehicle entry/exit buffer profile (block 754), and a vehicle merge/demerge profile (756).

The route plan may also include vehicle profiles associated with various TMS(s) 108. For example, the route plan may include vehicle profiles for TMS(1), TMS(2), and TMS(3). At block 758 for TMS(1), the RJIS 300 may include a vehicle cruise profile (block 760). At block 762 for TMS(2), the RJIS 300 may include a vehicle traverse profile (block 764). At block 766 for TMS(3), the RJIS 300 may include another vehicle traverse profile (block 768).

The route plan may include vehicle profiles for egress from a boarding zone, such as traveling through an egress buffer (block 770). The vehicle profiles during BMS_Egress may include a vehicle merge/demerge profile (block 772), a vehicle entry/exit buffer profile (block 774), and an embark/disembark profile (block 776).

Booking System

A booking is a negotiation between a passenger and the system, represented in some embodiments, by a booking system where a passenger selects at least an origin and destination pair and either a departure time or an arrival time. This information, with passenger identity(ies), location information, preferences and/or other pertinent information may be provided by the passenger, often through an application, to the booking system.

In some embodiments, the booking system may then calculate the appropriate distributed boarding zones which are closest to the passengers selected origin and destination. Such origin and destination distributed boarding zones may also be selected by a passenger and/or offered to a passenger in an interactive manner through an application.

After booking a journey, a passenger may have a set of attributes associated with the journey. Example attributes may include: a) passenger identity information set, b) passenger journey origin and destination, c) assigned boarding zone and vehicle slot, d) passenger desired arrival time and/or system derived departure time (which may be provided as a range), and e) passenger determined departure time and/or system derived arrival time (which may be provided as a range).

Reservation System

In some embodiments, passengers confirm their bookings through a reservation system while ensuring that the overall system, through interactions with scheduling and matching systems can meet the terms of that booking.

When providing a passenger with a time period, the reservation system may create a time period granularity that includes time represented by the boarding zone ingress and egress buffers, which when coupled with the passenger buffer time of 30 seconds, provides a granularity for reservations of approximately one minute.

As passengers are unlikely to be accurate in their timing their own arrival with such accuracy and where each boarding zone has multiple boarding slots, reservation system may offer passengers timing based to the nearest minute, though with sufficient flexibility through vehicle and passenger buffers as well as passenger timings to have a vehicle available for them at the offered time.

Reservation systems may offer end point timing selection, i.e. when the passenger wishes to arrive at their destination and/or departure timing (e.g., when the passenger wishes to leave). Passengers may select either or both, and may have additional timing calculated, such as that form their current location to their origin BMS and from the destination BMS to the final destination.

Figure 13:
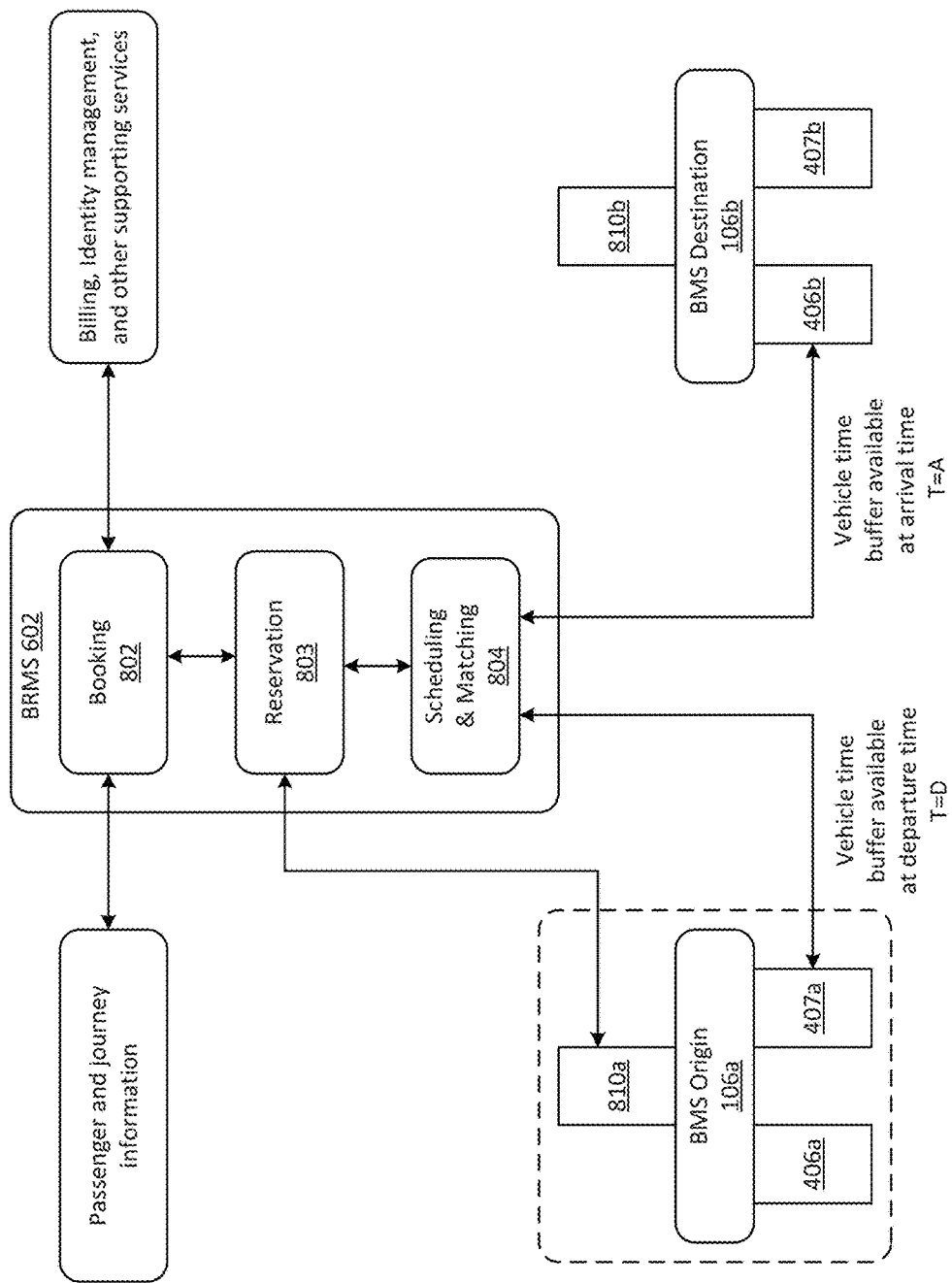
FIG. 13 illustrates and example embodiment of a booking, reservation, and matching system, according to an example embodiment of the present disclosure.

FIG. 13 illustrates an example embodiment of a booking, reservation and matching system ("BRMS") that interacts with two Boarding Zone Systems (106*a* and 106*b*) at an origin location and a destination location. In this example, reservation system 803, when interacting with booking system 802, incorporates passenger buffer time information from BMS 106*a* at the origin location. While attempting to satisfy the terms of such a booking, Scheduling and Matching 804 may incorporate the vehicle egress buffer time information from BMS 106*a* and vehicle ingress time information from BMS 106*b* at the destination location into the calculations and configurations for meeting the terms of the booking.

The reservation may include time allowance for a passenger buffer (e.g., passenger buffer 810*a*, 810*b*).

Scheduling and Matching System

The scheduling and matching system 804 allows for capacity management and resource allocation in the form of vehicles to meet passenger demand as created with booking system and managed by reservation system.

The scheduling system calculates the availability of an embarkation slot and disembarkation slot for a passenger as they make a reservation for their journey. The calculation includes the anticipated status of both embarkation and disembarkation BMS 106*a*, 106*b* at the requested time of departure or arrival. These calculations include the vehicle buffers (egress buffer 407*a* at departure zone or origin and ingress buffer 406*b* at arrival zone or destination) as well as any passenger specific information, such as their rate of travel when using a boarding zone. In this manner, the scheduling and matching systems calculate the time period in which the likelihood of the availability of a vehicle is sufficient to accept the reservation and create the RJIS 300 which instantiates the reservation.

When an RJIS 300 is instantiated, a logical vehicle may be assigned to at least one TMS 108 preceding the relevant origin BMS 106*a*, within the time period information of when a physical vehicle is planned to be available for a passenger. The TMS 108 may then attempt to match the logical vehicle to a physical vehicle, such that a vehicle becomes designated for this RJIS 300. The TMS 108 may then provide the VMS 110 with an appropriate information set, such as the BMS 106*a* for the vehicle to interact with. This information may then be communicated to that BMS 106*a*, which will then synchronize the vehicles arrival with the passengers that are scheduled to arrive at that boarding zone for embarkation Vehicles that TMS(s) 108 may attempt to match, may be executing an RJIS 300, in which case the destination BMS 106*b* may need a vehicle for embarkation of a passenger.

Other vehicles that TMS(s) 108 may attempt to match include those that currently do not have a passenger. These vehicles may communicate to TMS(s) 108 their energy or other status, which may be used in the matching process.

In an example, the system may be a closed system, such that scheduling and matching may not accept bookings for a particular time period if the bookings would likely cause the constant flow to cease or result in a significantly reduced flow. One of the factors of traffic flow is the availability of a slot for disembarkation for a passenger once a passenger has entered a vehicle. To achieve optimal flow, system managers may collaborate with scheduling and matching systems to orchestrate and manage the availability of such slots, such that passengers may only be offered reservations when the system has sufficient capacity to complete their journeys.

For example, if the egress buffer 407 at the embarkation boarding zone is 18 meters in length and the vehicles traverse this at 10 kph, then the buffer time is 6.48 seconds and at the disembarkation boarding zone, the ingress buffer, for example, is 33 meters in length then the buffer time is 11.88 seconds, totaling 18.72 seconds.

In some embodiments, the capacity of the system may be determined as the number (e.g., quantity) of logical vehicles and physical vehicles populating the one system at a point in time. For example, each logical vehicle represents a potential for a physical vehicle. For example, a BRMS 602 may create a logical vehicle when a reservation has been created and such vehicle may then be inserted into an operating vehicle flow such that the logical vehicle represents a potential physical vehicle, which is only assigned to the specific passenger when that passenger has been recognized by a boarding zone system.

In the same manner TMS 108 and BMS 106 create and maintain logical representations of their available capacity for optimum throughput and/or other specified performance metrics, which are then populated by physical vehicles for each time period.

Route Journey Information Set

An RJIS 300 may be created through the interaction of a passenger with a BRMS 602. Such an RJIS 300 may be communicated to the relevant TMS 108 and BMS 106 that comprise the planned route and origin/destination respectively. In this manner, both TMS(s) 108 and BMS(s) 106 may have foreknowledge of a vehicle that transit and embark/disembark a passenger respectively. This information, in terms of time, can be used by such systems to ensure that constant flow is maintained at the optimum rate available based on the number (e.g., quantity) of vehicles in such flow and the provision of boarding slots for embarkation and disembarkation of a passenger.

FIGS. 3A and 3B illustrate an example RJIS 300. Each RJIS 300 has a header/identifier 301 that facilitates the interactions of each of the systems to identify operate with a unique operative instance of that RJIS 300. In some embodiments, such RJIS 300 may be persisted in one or more repository to create a history of such routes and journeys, which may then be evaluated by one or more algorithms, including for example machine learning techniques. Such evaluations may create one or more feature sets that can be used to further optimize a deployment.

Origin/Destination O/D 302 represents the origin and destination boarding zones that a passenger may use to undertake their journey. The embarkation boarding zone may be selected based on location information provided by and/or derived from the passengers location at the time of booking. The destination boarding zone may similarly be selected and/or derived for the passengers selected destination location. In both cases at the time period selected/calculated, both boarding zones provide a vehicle that is available for their journey and a disembarkation slot for the completion of their journey.

Passenger information includes the passenger identity 303 which the passenger has established and validated with the system. Such validation and verification may include, for example, financial verification through one or more payment means (for example credit card), facial or other biometric identification, device authentication (such as a smart phone), issuance of stored value card/token or similar and the like.

There may be passenger preferences and other information sets that can be referenced through passenger preferences 304. Such information, including salient to the specific journey summaries thereof, maybe included by embedding and/or reference. For example, this may include personal information, such as their preferences as to sharing vehicles, their travel companions (for example family members, friends, business colleagues and the like), their regular journeys, biometric attributes (including for example walking speed, physical impediments and the like), associated devices, booking and reservation applications and associated information sets (frequent locations, times of travel, payment types and the like) communications preferences and the like.

In combination, passenger information (e.g., passenger identity 303 and passenger preferences 304) may be used to personalize a passengers' journey and associated experience for example by minimizing the distance they must travel through slot allocation, providing customized communications or other services during their journey, informing passenger of information pertinent to their journey and/or related to their destination, communicating passenger journey information to other passengers as specified by preferences and the like.

An RJIS timing information set 305 represents the relative timings for each segment of a journey, including the anticipated timings for each vehicle profile being undertaken as part of the route plan for that journey. Such timings are relative to the planned route timing and include allowance for the operation of the passenger and vehicle buffers such that there is a range of times for each of the buffers and a set of times for each of the profiles, which are correlated with the TMS 108 and BMS 106 to provide estimations of the journey timing and passage of a vehicle through the track segment managed by the TMS 108 and from and to the boarding zone managed by the BMS 106.

Timing information set 305 segmented and associated with relevant BMS information set 306 and TMS information set 307, which retain the projected and then actual times for both TMS 108 and BMS 106. For example, time projected and actual timings for entering, transiting and exiting a TMS 108.

Route planning information 308 incorporates the relevant BMS and TMS, associated timing information and the appropriate vehicle profile information sets 309 to create an anticipated route for the journey to be undertaken. This information is then transferred, by reference or embedding into Journey execution 310, where each BMS 106 and TMS 108 provides the actual timings at which the journey events occurred, for example entry of a passenger into a vehicle, departure of vehicle from boarding slot, entry of vehicle into egress buffer and the like. This journey execution information 310, in some embodiments may be quantized to the vehicle profile sets operating at the time and may inform, VMS 110, TMS 108 and BMS 106 as to the operations of the vehicle undertaking the journey.

The RJIS 300 may be used by system managers for a number of operations, such as those undertaken by BRMS scheduling systems.

FIG. 12 illustrates an example of a set of vehicle profiles such as those that may be represented in FIGS. 3A and 3B (e.g., vehicle profile sets 309). Each profile has a set of conditions, as illustrated in FIG. 11, where each of the condition sets therein may have an associated set of time periods that are related to the timing information set 300 and Route planning 306 illustrated in FIGS. 3A and 3B. In an example, a vehicle profile set may include one or more vehicle operation states that define vehicle speed, vehicle acceleration, and/or vehicle maneuvers.

Boarding Zone Systems

Figure 14:
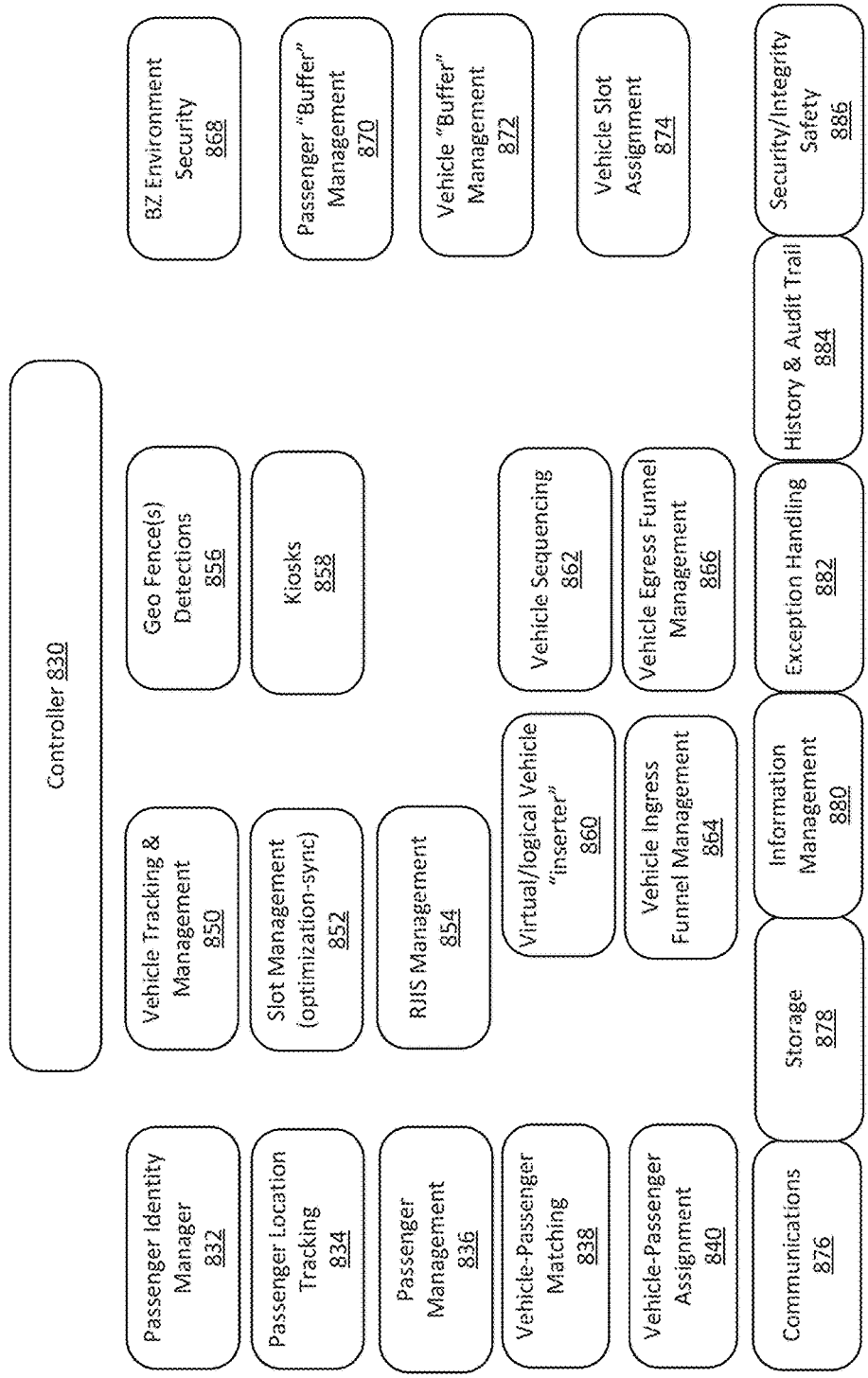
FIG. 14 illustrates a block diagram of example boarding management systems, according to an example embodiment of the present disclosure.

In some embodiments, a boarding zone system may comprise a set of components, such as those illustrated in FIG. 14, which in combination provide a set of capabilities to manage the interactions of vehicles and passengers.

Each of the passenger and vehicle interactions may involve a buffer function, in that there is an available time for the synchronization of the assignment of a vehicle to a passenger for a specific journey, which has been instantiated as an RJIS 300, which may be managed by RJIS management systems 854. Additionally, each of the interactions between the vehicle and passenger may be controlled via controller 830 and the various components illustrated in FIG. 14.

Passenger Identity Manager 832: This element identifies a passenger through one or more techniques, including face, gait and/or other biometric recognition, device recognition, passenger declaration (for example self-identification at a kiosk) and the like. This information set may be used, in part to track the progress of a passenger to the boarding zone slots and subsequently to the assigned vehicle for their journey. For example, the geographically delineated area of the boarding zone may include one or more sensors to allow recognition and monitoring of passengers. In an example, passenger recognition includes establishing the location of the passenger through opt-in device based location systems, preferably through one of Bluetooth, RFID, and GPS.

Passenger Location Tracking 834: This includes establishing the location of the passenger, either through opt in device based location systems and/or through self-declaration by the passenger at the time of the interactions with BRMS systems. Such information may be used in part to determine which boarding zone a passenger is directed to, the likely transit time for their travel to such a zone, and the direction from which the passengers approach such a zone.

Once a passenger has entered a boarding zone outer geo zone, their presence may be either detected by one or more passenger identification systems or they may announce their presence through interaction with at least one kiosk or other boarding zone passenger management system 836. For example, they may possess a bar code, electronically or physically which they present or they may simply provide details of their booking, such as a confirmation number or similar.

Various systems may track, match, and assign passengers to vehicles including passenger management systems 836, vehicle-passenger matching systems 838, and vehicle-passenger assignment systems 840.

Kiosks (e.g., kiosks 412 as illustrated in FIG. 4A) may be positioned in the outer geo zone 402 of a boarding zone to permit those passengers who do not have a device, have not preregistered their identity or may need to provide further confirmation to establish their presence at a boarding zone for the purpose of undertaking a pre-arranged journey.

A kiosk 412 may, in some embodiments, be able to recognize a passenger, provide a passenger with a printed bar code for a vehicle, accept a value token or other stored value card, coordinate a passenger transaction for a passenger whose booking was undertaken by another registered system user and the like.

Within the boarding zone, geo fence detection systems 856 and kiosk systems 858 may assist with passenger tracking.

Slot Management—a BMS 106 may operate to permit each slot to manage the throughput of passengers and/or vehicles including optimization of such. The BMS 106 may also coordinate the operations of sets of slots so as to optimize the throughput of the boarding zone comprising a number (e.g., quantity) of slots.

Slots and vehicles may be managed by Vehicle Tracking & Management systems 850 and slot management systems 852.

In some embodiments, a slot may execute one or more "games" whereby slot management systems attempt to optimize one or more variables of such a game. For example, a slot manager may attempt to maximize the throughput of passengers by accepting only those passengers whose average dwell time is low. A slot manager may attempt to optimize passenger "glide", such that the arrival of the vehicle and availability of that vehicle to a passenger has the minimum time a passenger waist and the minimum time a vehicle is at rest.

Figure 15:
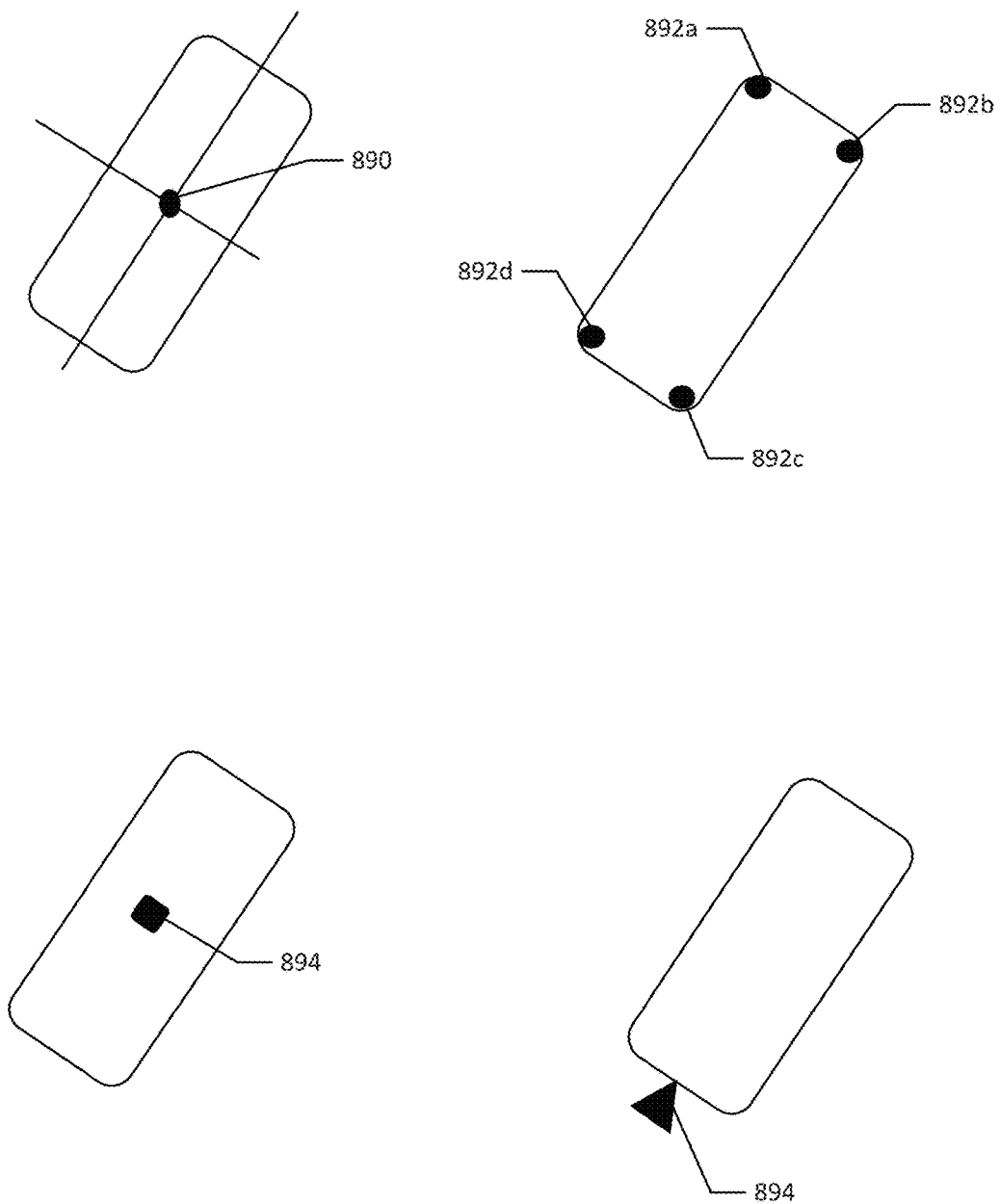
FIG. 15 illustrates example vehicle slots, according to example embodiments of the present disclosure.

Each slot may have a number of capabilities as illustrated in FIG. 15. For example, vehicle slots or embarkation slots may be marked with beacons, boundary markers, machine readable location information, or the like. The beacons and/or boundary markers may be active or passive. The beacons or markers may include implicit or explicit markings, surveillance, radio based connections, location tracking, RF ID and/or other token detections, etc. For example, an active marker may include an unpowered RFID tag or other tag that is magnetically or optically activated.

A vehicle control system ("VCS") or vehicle management systems (e.g., VMS 110) may use any of the slot capabilities to assist the vehicle in positioning itself within the frame of reference of the slot. For example, a slot may have a center marker 890 that is recognizable by a vehicle to support vehicle positioning, for example using a downward facing camera which may recognize a pattern placed on the roadway, a point embedded into the roadway or the like. Other sensors such as radar, ultrasound, IR or other active emissions may be used with appropriate reflector/refractor which may be used to identify the center point, such as those incorporated in the vehicle.

A slot may have one or more boundary markers 892 (e.g., boundary markers 892a-d), which identify specific boundary elements of a slot, for example the four corners. These may be used by a vehicle to align itself to a slot when entering a slot and to position the vehicle. Such markings may include patterns, embedded reflectors/refractors and the like, which may be sensed by the vehicles one or more sensors. The boundary markers 892 may be recognizable by a vehicle to support vehicle positioning.

Each slot may have one or more beacons 896 that provides an active signal that that communicates with a vehicle to support vehicle maneuvers and/or to identify presence and/or absence of a vehicle in a specific slot. Such beacons may be codified by slot and/or operate on narrow beams that can only be accessed once a vehicle is correctly aligned to a specific slot.

In some embodiments, a slot may have a mechanism for charging a vehicle, for example there may be a retracting plate in the ground that when the vehicle is correctly positioned is inserted into the vehicle (or that the vehicle deploys into the uncovered receptacle), that may then charge the batteries of the vehicle. Receptacle 894 illustrates such a charger, which in this example is positioned at the center of the slot and acts as a center marker for vehicle alignment.

Geo-Zones may, for example, include one or more geo fenced locational boundaries, such as those shown in FIG. 4A for example those created through implicit or explicit markings, surveillance, radio based connections, location tracking, RF ID and/or other token detections and the like. For example, this may include a series of concentric or other geometrically arranged geo fenced areas that provide an event or alert when a passenger enters such a zone. The identification of such a passenger may, in part, be determined through information sets that are provided by a passenger, for example their location provided by a suitably enabled device, such as a smart phone, though calculation derived in part through knowledge of their location at the time of reservation and/or by other location factors.

Such an embodiment is illustrated in FIG. 4A. In this example embodiment, a boarding security zone perimeter is established through the deployment of one or more surveillance systems, for example cameras that provide coverage of the area adjacent to the outer geo zone 402 and may provide additional coverage across the whole boarding zone area. These surveillance systems may incorporate one or more identity recognition systems that are able to identify passengers, including groups of passengers, as well as people with identifiable malevolent or hostile intent.

In an example, an embodiment may include an outer zone 402, and inner zone 403, and a vehicle zone 404. Outer zone 402 may have a perimeter at a distance, for example 45 m, from a boarding slot or vehicle slot (or set thereof). When a passenger arrives at such a zone perimeter, passenger identification may undertaken, either by opt in form the passenger, such as recognition and acknowledgement of at least one device the passenger is carrying, for example by detection using Bluetooth, RFID, other forms of radio or other electronic based recognition and the like and/or by observation, using, for example camera's for facial recognition, gait recognition and the like and/or by messaging, such as using text messages or similar. In the example where the passenger does not have a suitable device, token or other means for electronic recognition, they may be directed to attend a kiosk, such as those illustrated in FIG. 4A, for recognition and potentially to complete a transaction that has been initiated at a time of booking. The entry to the outer geo zone may initiate the passenger-vehicle buffer, where for example a 30 second time buffer is established prior to the passenger reaching a slot that has been assigned to that individual passenger at their time of reservation, based on, for example, the location information received by a reservation system at the time of booking, the preferences of the passenger, historical information about passenger behavior in boarding zones and the like which may have been dynamically updated thereafter.

A passenger traversing the outer geo zone 402 in the direction of the vehicle boarding slots 405 may be assigned a vector 408 which represents their trajectory towards the boarding slots. This information may be used to determine which slot may be assigned to the passenger, which may include consideration of the convenience for the passenger, for example the nearest slot to the passenger, the time for a vehicle departure, for example a vehicle may have a scheduled departure that coincides with the passenger embarkation time, a vehicle that may have an extended dwell time at a boarding slot and thus may accommodate passengers requiring additional time to board and the like. The transit time for an average person walking at 1.5 m/sec, is 18 seconds, which is the time duration of a passenger traversing this buffer.

Inner zone 403 may be positioned within the outer zone with a perimeter of, for example, 18 m, representing a potential buffer of 12 seconds as a passenger makes their way to a either a specified boarding slot or set of boarding slots. When the passenger is traversing this zone, the vector 408 of their trajectory may be monitored as well as their velocity. In some embodiments, a preliminary assignation of a boarding slot (or set thereof) may be assigned to the passenger. The transit time for an average person walking at 1.5 m/sec, is 8 seconds, which is the time duration of a passenger traversing this buffer.

Vehicle Zone 404 may be positioned within both outer and inner zones and may be closest and, in some embodiments, adjacent to a set of vehicle boarding slots, which for example could be at 6 m. In some embodiments, a passenger may be directed to a specific vehicle occupying a slot, and such vehicle may provide such a passenger one or more means for that passenger to identify such a vehicle. In some embodiments, passenger-vehicle assignment may be completed at the time a passenger enters the vehicle zone. For example an event may be generated where a vehicle with an at least locally unique identifier is assigned to a specifically identified passenger. The information set related to the event generation may be communicated to one or more control systems, including for example a reservation system and/or scheduling matching system. This relationship may be maintained for at least the duration of the journey and may be incorporated in one or more repository for further analysis. In this manner, passenger behaviors and characteristics may be determined and where appropriate used to optimize system operations and/or optimize passenger experience. The transit time for an average person walking at 1.5 m/sec, is 4 seconds, which is the time duration of a passenger within this buffer.

For each passenger entering these zones may be associated with an estimated time range encompassing the time a passenger enters and then exits such a zone that may be used by a scheduling system to inform and optimize both the specific vehicle the passenger will occupy and one or more system managers that operate such a system.

For example, a typical person may walk at a pace of, for example between 1 m and 2 m per second, though the average rate is often considered to be 1.4 m/sec. However, allowing for the passenger behavior of not wanting to "miss" their assigned vehicle, we have used the figure of 1.5 m/sec as an initial basis.

In this manner, it may be calculated that a scheduling system may have the following lead times based on a passenger, who undertakes a booking and consequently makes a reservation for a journey.

BMS Security Zone(s) may incorporate one or more surveillance systems, including cameras, motion detectors, light or other RF barriers and the like. BMS Boarding Zone security perimeter 401 encompasses the one or more GEO zones (e.g., 402, 403, and 404) that operate within a boarding zone.

In some embodiments, BMS environment security management 868 may monitor through such surveillance systems, and where appropriate provide one or more alerts or other events to other BMS elements and/or to one or more control monitoring systems, for example a control room that monitors a surveillance system deployment.

RJIS Management

RJIS management 854, in some embodiments, accepts RJIS communicated to the BMS 106 by, for example, a BRMS and extracts from RJIS timing, routing and passenger information sets for further processing. Such processing includes:

Evaluating timing information in RJIS 300 and adding such information to scheduling system of BMS 106.

Evaluating routing information included in RJIS 300 to establish vehicles will pass through which TMS 108 that are destined for this BMS 106.

Evaluating passenger identification information for those passengers disembarking at BMS 106.

Evaluating passenger identification information for those passengers embarking at BMS 106.

Integration of passenger preferences into passenger operations by BMS 106.

Vehicle Assignment

A vehicle may be assigned to a passenger when both vehicle and passenger are a specified time and/or distance from entering the vehicle boarding slot zone and reaching the end of the boarding zone passenger buffer respectively. In an example, vehicle and passenger assignment may be handled by vehicle-passenger assignment systems 840. Similarly, vehicle slot assignment may be handled by vehicle slot assignment systems 874. In the case of the passenger this may be within 4 seconds of their arrival at the slot for boarding the vehicle, or some other short time period that allows smooth system operation. In the case of the vehicle, this may be based on the approximate time for the vehicle to enter the slot zone and navigate to the relevant vehicle slot 405 and park therein.

In an example, a vehicle may be assigned to a respective passenger as the vehicle enters a vehicle ingress buffer 406 before a vehicle slot such that the arrival of the passenger and the vehicle are coordinated at the vehicle slot. Vehicle coordination may be handled by virtual/logical vehicle "inserter" systems 860, vehicle sequencing systems 862, vehicle ingress funnel management systems 864 and/or vehicle egress funnel management systems 866. Additionally, a passenger may be preliminarily assigned to a group of vehicles according to passenger information. For example, passengers may be assigned according to passenger rate of travel, passenger physical limitations or attributes, and/or passenger preferences. For example, a passenger may prefer additional leg room and prefer to be matched with larger vehicles.

Vehicles and passenger buffers may be managed by passenger "buffer" management systems 870 and vehicle "buffer" management systems 872.

Vehicle Identification

In some embodiments, the matching of a vehicle to a passenger may involve employing one or more matching algorithms, which involve the identities of both the vehicle and a passenger. Matching may be achieved via vehicle-passenger matching systems 838. For example, a passenger may present themselves to a vehicle which has been reserved for a journey, and such passenger may be directed, by for example a BMS 106, to a specified boarding slot that is commensurate with the timing information of their reservation (for example as specified in their RJIS 300). For example, a passenger may be directed to a specific slot number at a specific boarding zone at a specified time period. The BMS 106 and/or vehicle may then inform, through display and/or interaction an identifier for the specific vehicle for the passenger to make their journey.

This approach may be most suitable for conditions where there are only a few people and few vehicles (e.g., a residential area where the vehicle may be situated outside the users address). For crowded areas, where multiple people are present at a specific time period (e.g., when a theatre empties) there may be multiple vehicles that have been scheduled to match to that set of users. In such a scenario with multiple vehicle in a crowded area, there it may be most suitable to determine the appropriate allocation of vehicles to users in an efficient and user friendly manner.

In some embodiments, identifying assigned vehicles to passengers may be achieved through the use of vehicle identifiers, such as for example signage on the vehicle, indicators directing a specific user to a specific vehicle, recognition by a vehicle, user characteristics detection such as via facial or movement features other biometric characteristics, detection by the vehicle of an RF tag, Bluetooth signal and/or other electronic identifying signal, recognition of a bar code displayed on a user's device and/or other identification approaches that are capable such matching. For example, a vehicle may send a specific user a message, which includes a set of instructions and/or indications, such as dots on a map, audible beeps, haptic indicators and/or other indicative information, that enables a user to present themselves, and potentially their credentials to such a vehicle. In this manner, a set of vehicles may match to a set of users without requiring a specific vehicle to match to a specific user.

In the situation where there is an extremely large amount of users requiring a large number (e.g., quantity) of vehicles in a short time period, for example when a sports event finishes, there may be a large set of vehicles that are pre-positioned and using similar approaches to those described herein each user may be allocated to a vehicle.

In some embodiments, a user may be offered a more convenient vehicle allocation if they are prepared to share the vehicle with another user. Additionally, in some embodiments, a user may have a device which has an application (e.g., mobile application) which provides user with information sets that support their navigation to and/or of a boarding zone, including directions to their respective assigned vehicle and boarding slot. Boarding zones may be fixed at specific positions and/or may be dynamically located depending on availability of roadway and/or other considerations.

Other systems include communications 876, storage 878, information management 880, exception handling 882, history and audit trail 884, and security/integrity and safety 886. These systems and components may work in conjunction with and provide support to other boarding zone components and systems in FIG. 14.

Figure 16:
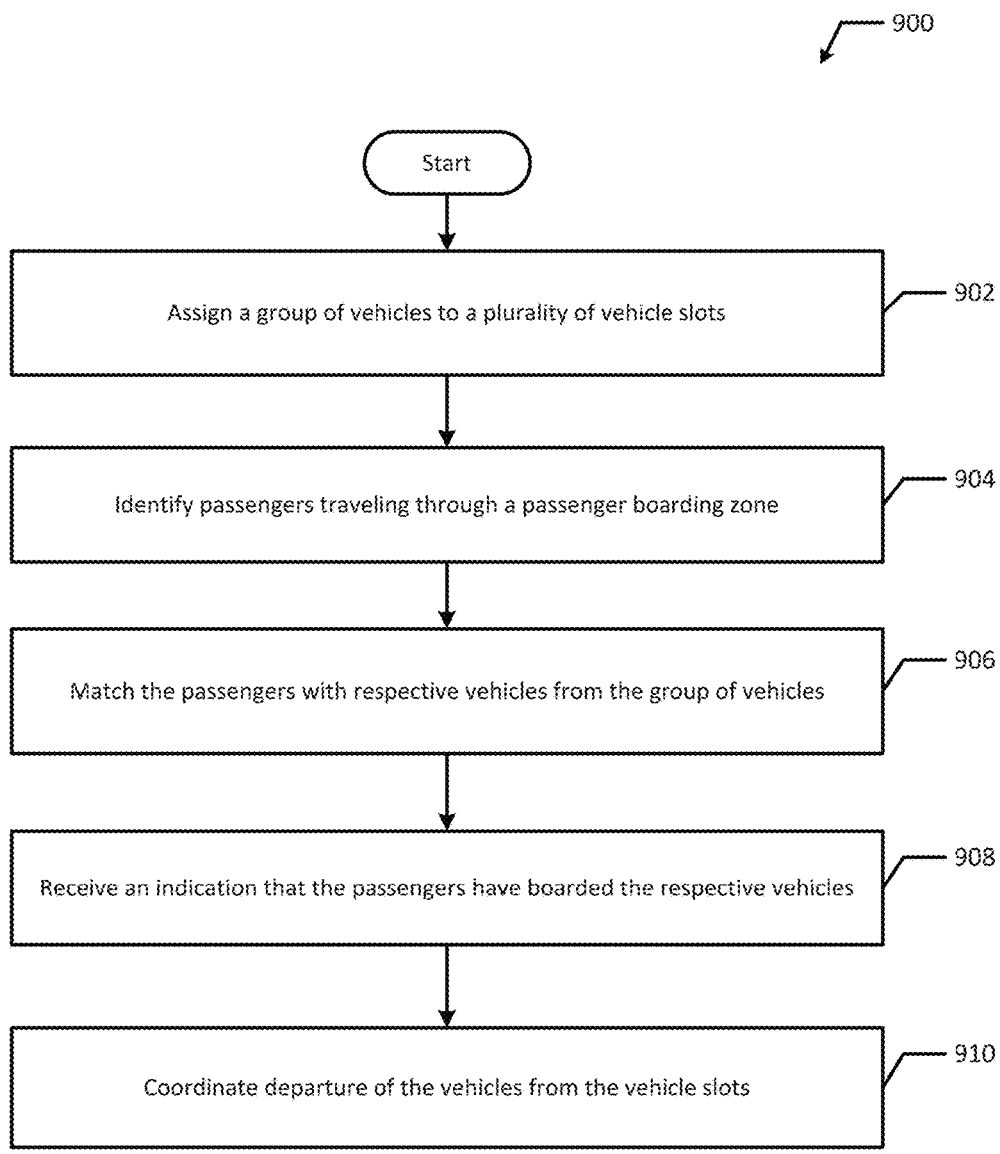
FIG. 16 illustrates a flowchart of an example method for coordinated embarkation, according to an example embodiment of the present disclosure.

FIG. 16 illustrates a flowchart of an example method 900 for coordinated embarkation. Although the example method 900 is described with reference to the flowcharts illustrated in FIG. 16, it will be appreciated that many other methods of performing the acts associated with the method 900 may be used. For example, the order of some of the blocks may be changed, certain blocks may be combined with other blocks, and some of the blocks described are optional.

In the illustrated example, a group of vehicles may be assigned to a plurality of vehicle slots (block 902). For example, a controller, such as a central controller 202 and/or a boarding zone controller 206, may assign a group of vehicles to vehicle slots where passengers can board the vehicles. Then, passengers traveling through a passenger boarding zone may be identified (block 904). The passenger boarding zone may be adjacent to the plurality of vehicle slots. In an example, the boarding zone controller 206, may identify passengers traveling through a passenger boarding zone. Next, the passengers may be matched with respective vehicles from the group of vehicles (block 906). For example, the boarding zone controller 206, may match the passengers with respective vehicles from the group of vehicles. In an example, the group of vehicles may be a coordinated group. Matching passengers with respective vehicles may be based on positions of the passengers in the geo-zones (e.g., 402, 403, and 404 of FIG. 4A), such as the vehicle zone 404, relative to the respective vehicles. For example, passengers may be matched to vehicles based on the proximity of the passenger to the respective vehicle and/or the respective vehicle slot 405. In an example, the matching may occur as the passenger enters either the inner zone 403 or the vehicle zone 404 of FIG. 4 as indicated by 409. Preferably, passengers and vehicles are matched after the passenger enters the vehicle zone 404 to ensure passengers are optimally matched to the most convenient vehicle and or vehicle slot 405. Additionally, passengers may be matched to respective vehicles and/or vehicle slots based on estimated arrival times of each passenger to the respective vehicle and/or vehicle slot. For example, the boarding zone controller 206, may track a passengers movement and calculate a passenger vector 408 of FIG. 4, which may be used to estimate passenger arrival times to a vehicle slot 405. Matching may also be based on traffic patterns of the continuous flow near intended destinations of the passenger and vehicle.

After the passengers board the vehicles, an indication may be received that the passengers have boarded (block 908). For example, a vehicle controller 210 and/or a boarding zone controller 206 may receive an indication that the passengers have boarded the respective vehicles. The indication may be provided by the passenger through an application provided on a user device. Additionally, the indication may be received by a vehicle control system or VMS 110. For example, the vehicle controller 210 may send the indication to the boarding zone controller 206 through the communication modules of each controller. Then, departure of the vehicles from the vehicle slots may be coordinated (block 910). For example, the boarding zone controller 206 and other applicable controllers (e.g., track management controllers 208, vehicle controllers 210, central controller 202, etc.) may coordinate departure of at least a subset of the group of vehicles from the vehicle slots back into the continuous flow of vehicles. In an example, the entire group may depart together. In another example, a subset of the group may depart to compensate for variations in passenger boarding time and other traffic pattern considerations.

Similar to departure, an arrival of the group of vehicles to the plurality of vehicle slots may also be coordinated. For example, while vehicles are arriving to an embarkation area or disembarkation area, the central controller 202 and/or a boarding zone controller 206 may assign the group of vehicles to vehicle slots.

Figure 17:
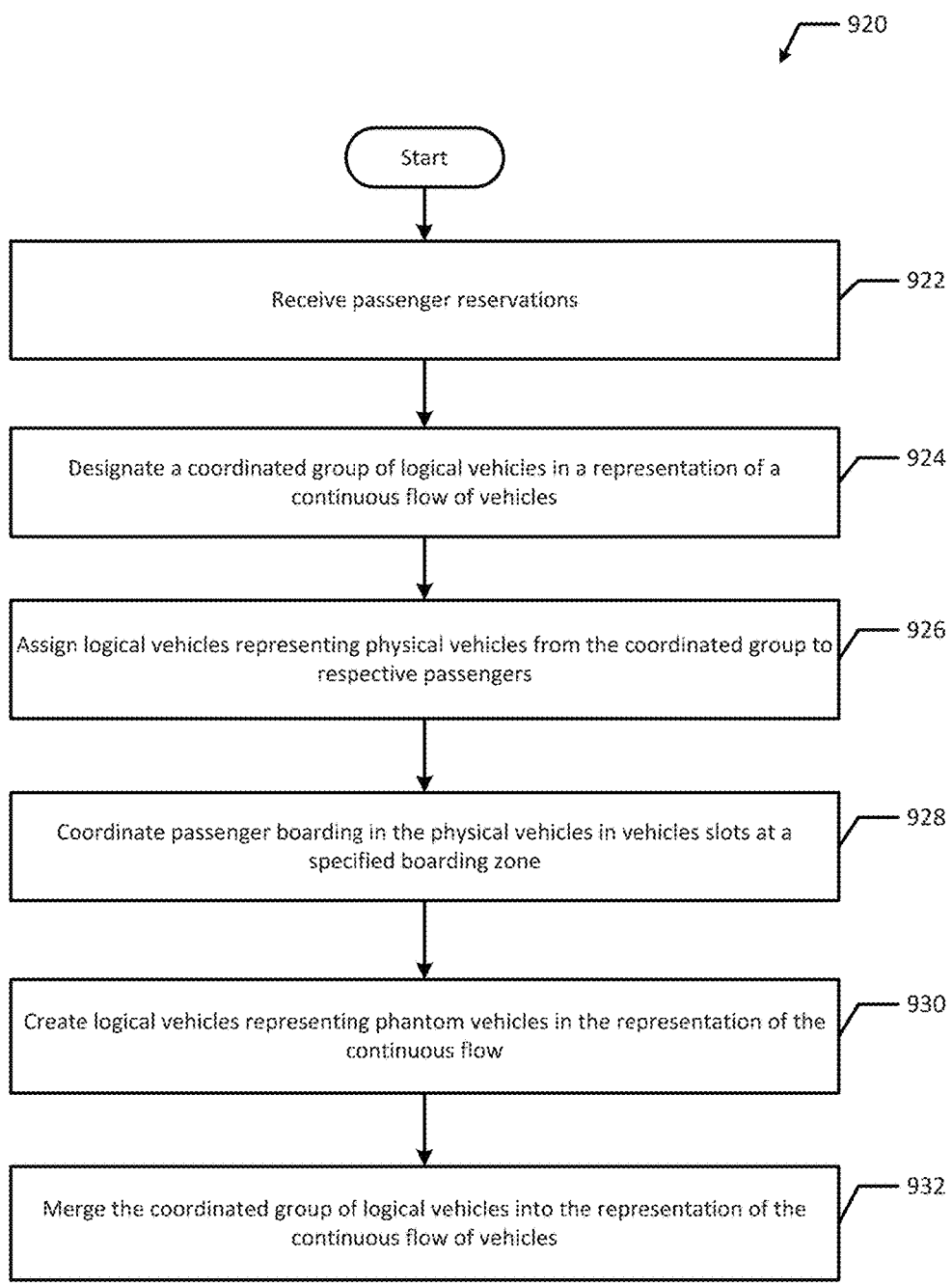
FIG. 17 illustrates a flowchart of an example method for assigning physical vehicles to positions in a continuous flow of vehicles, according to an example embodiment of the present disclosure.

FIG. 17 illustrates a flowchart of an example method 920 for assigning physical vehicles to positions in the continuous flow. Although the example method 920 is described with reference to the flowcharts illustrated in FIG. 17, it will be appreciated that many other methods of performing the acts associated with the method 920 may be used. For example, the order of some of the blocks may be changed, certain blocks may be combined with other blocks, and some of the blocks described are optional.

In the illustrated example, one or more passenger reservations may be received (block 922). For example, a reservation controller 204 and/or a BRMS 602, may receive a plurality of passenger reservations. Then, a coordinated group of logical vehicles may be designated in a representation of a continuous flow of vehicles (block 924). For example, various management systems (e.g., CMS 102, TMS 108, BMS 106, VMS 110) and associated controllers, may designate the coordinated group of logical vehicles in a representation of the continuous flow. The representation of the continuous flow may include location information of the logical vehicles, which may be represented as logical blocks. The logical vehicles representing physical vehicles may be assigned to respective passengers (block 926). For example, the logical vehicles may be assigned to respective passengers with confirmed passenger reservations. In an example, a controller such as the boarding zone controller 206 and/or reservation controller 204, may assign the logical representation of the physical vehicles to passengers if there is sufficient capacity within the continuous flow. For example, if there is insufficient capacity within the continuous flow, a passenger reservation may be pushed back or denied until capacity for that passenger becomes available.

As discussed above, assigning the logical representation of a physical vehicle to a respective passenger may include determining a travel time of the passenger within a geo-zone, such as the vehicle zone 404 of FIG. 4A. In an example, assigning a physical vehicle (e.g., logical representation of a physical vehicle) to a passenger may include creating a dynamic vehicle buffer such that the arrival time of the passenger and the vehicle at the vehicle slot is substantially simultaneous. The dynamic vehicle buffer may include a boarding zone ingress buffer 406 and/or a boarding zone egress buffer 407, as illustrated in FIGS. 4A and 4B. Further, the rate of travel of the vehicles through one or more of the dynamic buffers may be adjusted to compensate for other travel factors to ensure that the physical vehicle merges with the phantom vehicle in the continuous flow of vehicles.

Then, passenger boarding in the physical vehicles in vehicle slots at a specified boarding zone is coordinated (block 928). For example, a reservation controller 204 and/or a boarding zone controller 206, may coordinate passenger boarding according to confirmed passenger reservations. As discussed above, passenger reservations are confirmed according to capacity in the continuous flow. Logical vehicles representing phantom vehicles in the representation of the continuous flow may be created (block 930). For example, the reservation controller 204, may create logical representations of phantom vehicles in the continuous flow to provide a place holder for the physical vehicle that a passenger has been assigned and/or boarded. Then, the coordinated group of logical vehicles may be merged into the representation of the continuous flow of vehicles (block 932). For example, various management systems and controllers may communicate to merge the coordinated group of logical vehicles (representing physical vehicles) into the logical representation of the continuous flow of vehicles by having the physical vehicles occupy the spaces in the flow allocated to the phantom vehicles.

Figure 18:
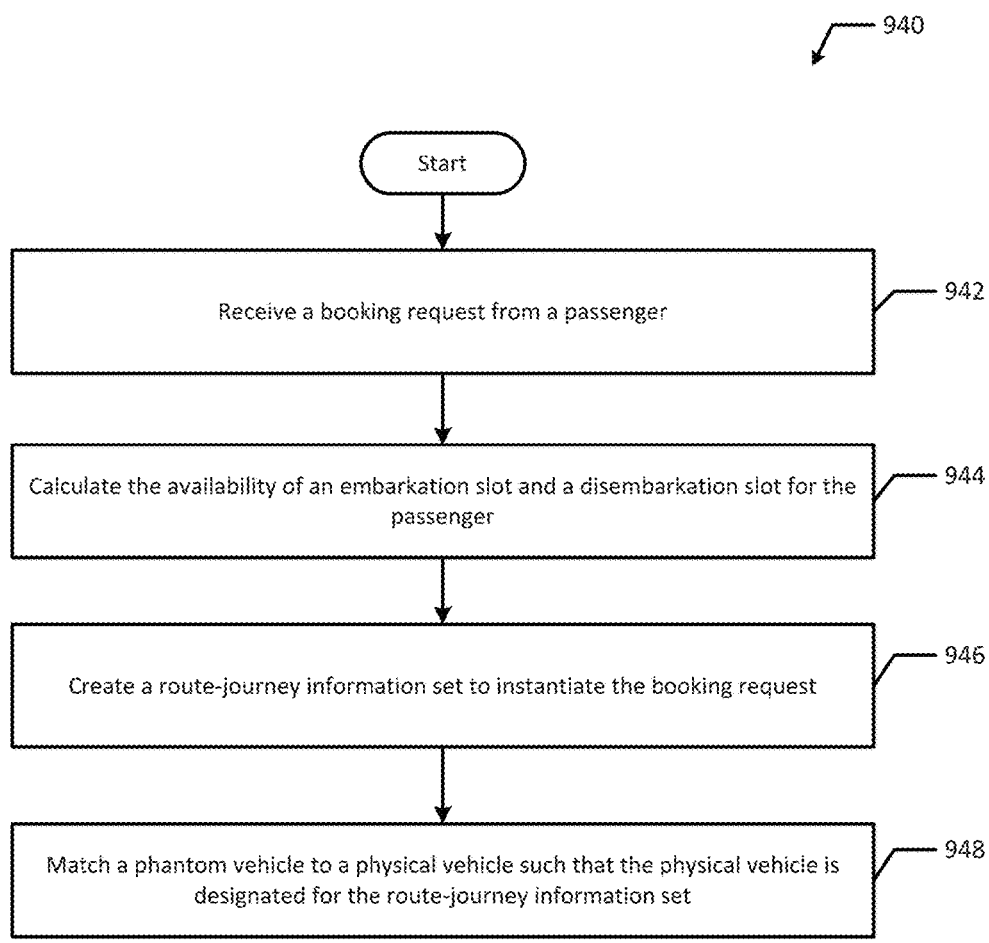
FIG. 18 illustrates a flowchart of an example method for trip reservations, according to an example embodiment of the present disclosure.

FIG. 18 illustrates a flowchart of an example method 940 for trip reservation. Although the example method 940 is described with reference to the flowcharts illustrated in FIG. 18, it will be appreciated that many other methods of performing the acts associated with the method 940 may be used. For example, the order of some of the blocks may be changed, certain blocks may be combined with other blocks, and some of the blocks described are optional.

In the illustrated example, a booking request from a passenger is received (block 942). For example, a reservation controller 204, may receive a booking request from a passenger which includes passenger and journey information. The journey information may include a departure zone and an arrival zone. Then, availability of an embarkation slot and/or a disembarkation slot for the passenger may be calculated (block 944). For example, the reservation controller 204, may calculate the availability of an embarkation slot and a disembarkation slot for the passenger based on information at specific boarding zones and the continuous flow. In an example, calculating the availability of an embarkation slot and/or a disembarkation slot may include calculating one or more vehicle buffers and passenger specific information. The passenger information may include passenger rate of travel, for example, through geo-zones at departure zone. The vehicle buffers may include an egress buffer at the departure zone and an ingress buffer at the arrival zone such that buffers are provided for the vehicle re-entering the continuous flow and exiting the continuous flow to arrive at a vehicle slot at the destination.

A route-journey information set may be created to instantiate the booking request (block 946). For example, the reservation controller 204, may create a route-journey information set to instantiate the booking request as a reservation for the passenger. The route-journey information set may include a passenger identity 303 and an intended route (e.g., route plan 308) as well as other items as illustrated in FIGS. 3A and 3B, for example, passenger preferences 304, vehicle profile sets 309, origin and destination information 302, etc. Then, a phantom vehicle may be matched to a physical vehicle such that the physical vehicle is designated for the route-journey information set (block 948). In an example, the phantom vehicle may be added to the continuous flow in response to the booking request or the reservation. Additionally, the continuous flow may include several place holder phantom vehicles to accommodate future passenger booking requests.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of at least partially autonomous vehicles;
a plurality of interconnected roadways having a plurality of track segments, wherein the roadways have at least partially separated lanes;
an embarkation area including a plurality of embarkation slots where passengers can board the vehicles, the embarkation area connected to at least one of the plurality of track segments, allowing the vehicles to travel to and from the embarkation area to the at least one of the plurality of track segments; and
a control system configured to coordinate a continuous flow of the plurality of vehicles on the track segments, wherein departing groups of vehicles traveling to different respective destinations depart from different embarkation slots of the embarkation area to the at least one of the plurality of track segments in coordinated groups that travel, at least in part simultaneously, from the embarkation area to the at least one of the plurality of track segments.

2. The system of claim 1, wherein the control system is further configured to coordinate an arrival of an arriving group of vehicles at the embarkation area, wherein the arriving group of vehicles are traveling from different starting points to the embarkation area and depart the continuous flow to arrive at the embarkation area.

3. The system of claim 2, wherein the control system is configured to form the coordinated arriving groups of vehicles when the vehicles are at least one of (i) traveling from a buffer to an embarkation slot, or (ii) traveling in the continuous flow, such that the vehicles arrive at the embarkation area from the at least one of the plurality of track segments in coordinated groups.

4. The system of claim 1, wherein the control system is configured to coordinate movement of the vehicles such that the coordinated groups at least one of (i) depart from the embarkation area to reenter the continuous flow, (ii) depart the embarkation area and reenter the continuous flow before traveling to a disembarkation area, or (iii) depart a disembarkation area and reenter the continuous flow before traveling to an embarkation area.

5. The system of claim 1, wherein the embarkation area includes buffers ahead of and behind the plurality of embarkation slots, the control system configured to synchronize motion of the coordinated groups through the buffers to and from the roadways.

6. The system of claim 5, wherein the control system is configured to use the buffers when coordinating the departure of vehicles from the embarkation area, the control system further configured to adjust the buffers to compensate for at least one of traffic patterns in the continuous flow and passenger boarding delays.

7. The system of claim 6, wherein the buffers include physical buffers, wherein the adjustment of the buffers includes altering a vehicle velocity such that the vehicle travels through a physical buffer in less time.

8. The system of claim 1, wherein the embarkation slots are marked with at least one of location beacons, boundary markers, and machine readable location information.

9. The system of claim 1, wherein the control system is configured to cause the continuous flow of vehicles to increase a separation between the vehicles in the continuous flow to allow the vehicle departing the embarkation area to merge with the continuous flow of vehicles on the roadways.

10. The system of claim 1, wherein the control system is configured to direct a second coordinated arriving group of vehicles from the continuous flow to the embarkation area to provide spaces in the continuous flow for each respective vehicle of the departing coordinated group to re-enter the continuous flow.

11. The system of claim 10, wherein the control system is configured to provide spaces in the continuous flow to the departing coordinated group by allocating a phantom vehicle to each space in the continuous flow, wherein each vehicle of the departing coordinated group re-enters the continuous flow by occupying the space in the flow allocated to each respective phantom vehicle.

12. A control system comprising:
a memory;
at least one processor in communication with the memory; and
at least one controller executing on the at least one processor, wherein the at least one controller is configured to:
assign a group of vehicles to a plurality of vehicle slots where passengers can board the vehicles;
identify passengers traveling through a passenger boarding zone, the passenger boarding zone adjacent to the plurality of vehicle slots;
match the passengers with respective vehicles from the group of vehicles;
receive an indication that the passengers have boarded the respective vehicles;
responsive to the indication, coordinate departure of at least a subset of the group of vehicles from the vehicle slots back into a continuous flow of vehicles.

13. The system of claim 12, wherein the at least one controller is further configured to coordinate arrival of the group of vehicles to the plurality of vehicle slots.

14. The system of claim 12, wherein matching the passengers with respective vehicles is based on at least one of (i) positions of the respective passengers in the passenger boarding zone relative to the respective vehicles, (ii) proximity of the respective passengers traveling through the passenger boarding zone to the respective vehicles of the coordinated group, (iii) proximity of the respective passengers traveling through the passenger boarding zone to the respective vehicles slots assigned to the respective vehicles in the coordinated group, (iv) estimated arrival times of each of the respective passengers traveling through the passenger boarding zone to their respective vehicles, and (v) traffic patterns of the continuous flow near intended destinations of the respective passengers.

15. The system of claim 12, wherein the plurality of vehicle slots include ingress buffers for vehicles entering the plurality of vehicle slots and egress buffers for vehicles leaving the plurality of vehicle slots, the at least one controller configured to synchronize motion of the group of vehicles in the ingress and egress buffers to and from the continuous flow of vehicles.

16. The system of claim 12, wherein the at least one controller is configured to use time buffers when coordinating the arrival and departure of the group of vehicles to and from the plurality of vehicle slots.

17. The system of claim 12, wherein the at least one controller is configured to allocate phantom vehicles in the continuous flow, and wherein the subset of the group, departing the plurality of vehicle slots, merges with the continuous flow of vehicles on the roadways by occupying spaces in the continuous flow allocated to the phantom vehicles.

18. A method comprising:
assigning a coordinated group of vehicles to a plurality of vehicle slots where passengers can board the vehicles;
identifying passengers traveling through a passenger boarding zone, the passenger boarding zone adjacent to the plurality of vehicle slots;
matching the passengers with respective vehicles from the coordinated group of vehicles;
receiving an indication that the passengers have boarded the respective vehicles; and
responsive to receiving the indication, coordinating a departure of at least a subset of the coordinated group of vehicles from the vehicle slots back into a continuous flow of vehicles.

19. The method of claim 18, wherein coordinating the departure of at least the subset of the coordinated group of vehicles includes adjusting buffers to compensate for at least one of traffic patterns in the continuous flow and passenger boarding delays.

20. A boarding zone management system comprising:
at least one vehicle slot configured to allow a vehicle to park in the vehicle slot;
a boarding zone vehicle ingress region connected to the at least one vehicle slot, the vehicle ingress region connecting a first track segment of a plurality of track segments of a dedicated roadway to the at least one vehicle slot;
a boarding zone vehicle egress region connected to the at least one vehicle slot, the vehicle egress region connecting the at least one vehicle slot to a second track segment of the dedicated roadway;
a passenger boarding zone with at least one geographically delineated area including one or more outer geo-zones and a vehicle geo-zone, the passenger boarding zone adjacent to the at least one vehicle slot so that passengers can embark and/or disembark from vehicles parked in the at least one vehicle slot; and
a controller configured to orchestrate the assignment of the at least one vehicle slot or vehicles entering the at least one vehicle slot to respective passengers traveling through the passenger boarding zone.

21. The system of claim 1, wherein the roadways include grade separated track segments dedicated to the plurality of at least partially autonomous vehicles.

22. The system of claim 1, wherein the control system is configured to form the coordinated departing groups of vehicles when the vehicles are at least one of (i) traveling from an embarkation slot to a buffer, (ii) in the embarkation area prior to passenger boarding, or (iii) in the embarkation area after passenger boarding.

23. The system of claim 5, wherein the buffers include physical buffers.

24. The system of claim 6, wherein the buffers include time buffers.

25. The system of claim 9, wherein the control system is configured to allocate a phantom vehicle in the continuous flow of vehicles such that the vehicle departing the embarkation area merges with the continuous flow of vehicles on the roadways by occupying a space allocated to the phantom vehicle.

26. The method of claim 19, wherein the buffers include time buffers.

* * * * *